United States Patent

Okutsu et al.

[11] Patent Number: 5,083,721
[45] Date of Patent: Jan. 28, 1992

[54] PHOTOGRAPHIC FILM CARTRIDGE

[75] Inventors: Kazuo Okutsu; Hisashi Takahashi; Haruo Ichikawa; Koichi Takahashi; Masuhiko Hirose; Kazunori Mizuno, all of Minami-Ashigara, Japan

[73] Assignee: Fuji Photo Film Co., Ltd, Kangawa, Japan

[21] Appl. No.: 472,493

[22] Filed: Jan. 30, 1990

[30] Foreign Application Priority Data

Jan. 31, 1989 [JP] Japan .................................. 1-21863
Aug. 17, 1989 [JP] Japan .................................. 1-211938

[51] Int. Cl.⁵ .............................................. G03B 1/02
[52] U.S. Cl. ................................ 242/71.1; 354/275
[58] Field of Search ........................ 355/72; 346/136; 242/71.1, 71, 71.3, 71.9, 71.8; 352/78; 354/275; 206/409

[56] References Cited

U.S. PATENT DOCUMENTS

| | | | |
|---|---|---|---|
| 2,153,573 | 4/1939 | Kinloch | 242/71.1 |
| 2,622,819 | 12/1952 | Goldhammer | 242/71.3 |
| 3,323,743 | 6/1967 | Landgraf | 242/71.8 |
| 3,383,068 | 5/1968 | Winkler et al. | 242/71.1 |
| 3,386,357 | 6/1968 | Kremp et al. | 242/71.1 |
| 3,695,160 | 10/1972 | Stockdale | 242/71.1 X |
| 4,138,068 | 2/1979 | Kinoshita | 242/55 X |
| 4,218,032 | 8/1980 | Nagel et al. | 242/71.1 |
| 4,221,479 | 9/1980 | Harvey | 242/71.1 X |
| 4,302,102 | 11/1981 | Stark et al. | 355/72 |
| 4,482,232 | 11/1984 | Engelsman et al. | 242/71.1 X |
| 4,832,197 | 5/1989 | Hara | 354/275 X |
| 4,889,292 | 12/1989 | Loewe et al. | 242/71.1 |

FOREIGN PATENT DOCUMENTS

| | | | |
|---|---|---|---|
| 768512 | 10/1967 | Canada | 242/71.1 |
| 828480 | 7/1949 | Fed. Rep. of Germany | 242/71.1 |
| 2601982 | 7/1976 | Fed. Rep. of Germany | 242/71.1 |
| 490069 | 10/1975 | U.S.S.R. | 242/71.1 |

Primary Examiner—Daniel P. Stodola
Assistant Examiner—John P. Darling
Attorney, Agent, or Firm—Sughrue, Mion, Zinn, Macpeak & Seas

[57] ABSTRACT

A photographic film cartridge typically including a cartidge case having a longitudinal axis, opposite end walls and a film outlet for feeding the film out; a spool extending substantially coaxially with respect to the cartridge case and carried at the opposite end portions by the opposite end walls of the cartridge case for rotation about the longitudinal axis of the spool, the spool being capable of being rotated from outside of the cartridge case; a film wound into a roll on the spool with an end of the film connected with the spool; a slidable cover provided on the cartridge case for slidably moving along a surface of the cartridge case toward the direction inclined to the film feeding direction to slide toward the direction to open and shut the film outlet, and further including device for keeping the film tightly wound into a roll on the spool, whereby the tip end of the film can be fed out through the film outlet by rotating the spool in the direction opposite to the film winding direction.

3 Claims, 16 Drawing Sheets

PHOTOGRAPHIC FILM CARTRIDGE

BACKGROUND OF THE INVENTION

The present invention relates to a photographic film cartridge, and in particular to a photographic film cartridge including a film wound into a roll on a spool.

DESCRIPTION OF THE PRIOR ART

Conventionally, film for still photography has been sold as wound into a roll on a spool housed in a cartridge case. The cartridge case containing the roll of the film is provided with a film outlet and the film is pulled out from the film outlet by a predetermined length when a photograph is to be taken.

Prior to using the cartridge, a leader extends out from the film outlet of the cartridge case by a certain length and when the cartridge is loaded into a camera the leader has to be engaged with the mechanism of the camera for feeding the film. The cartridge is thus troublesome to load and improper loading frequently occurs. In addition, the leader is sometimes pulled out from the film outlet more than needed so that a portion of the unexposed film is brought outside of the camera and exposed. Therefore, a camera without need for such troublesome loading has been desired.

OBJECT AND SUMMARY OF THE INVENTION

The above problems can be solved out by providing a photographic film cartridge which enables a film wholly accommodated in a cartridge case to be fed from the interior of the cartridge case to the outside. Using such a film cartridge, the tip end can be fed out to be engaged with a film feeding mechanism in a camera so that such troublesome operations as engaging the leader of the film with the film feeding mechanism in a camera is no longer necessary.

It is therefore the object of the present invention to provide a photographic film cartridge capable of feeding the film wound into a roll on a spool outside the cartridge case.

According to the present invention, the above object can be accomplished by a photographic film cartridge comprising: a cartridge case having a longitudinal axis, opposite end walls and a film outlet for feeding the film out; a spool extending substantially coaxially with respect to said cartridge case and carried at the opposite end portions by said opposite end walls of said cartridge case for rotation about the longitudinal axis of the spool, said spool being capable of being rotated from outside of the cartridge case; a film wound into a roll on said spool with an end of the film connected with the spool; a slidable cover provided on said cartridge case for slidably moving along a surface of the cartridge case in a direction inclined to the film-feeding direction to open and shut said film outlet.

In a preferred embodiment of the present invention, an inner surface of the slidable cover is provided with at least one projection and the tip end of the film is provided with holes in the same number as the number of the projections for engaging with the projections and feeding the film out through the film outlet as the slidable cover slides.

In another preferred embodiment of the present invention, the photographic film cartridge is further provided with means for keeping the film tightly wound into a roll on the spool, thereby enabling the tip end of the film to be fed out through the film outlet by rotating the spool in the direction opposite to the film-winding direction.

According to the present invention, the aforementioned object can be accomplished also by a photographic film cartridge comprising: a cartridge case having a longitudinal axis, opposite end walls and a film outlet for feeding the film out; a spool extending substantially coaxially with respect to the cartridge case and carried at the opposite end portions by the opposite end walls of the cartridge case for rotation about the longitudinal axis of the spool, the spool being capable of being rotated from outside of the cartridge case; a film wound into a roll on the spool with an end of the film connected with the spool; characterized in that a side surface of the cartridge case extending along the longitudinal axis of the cartridge case is pivotably carried at one edge of the cartridge case parallel to the longitudinal axis, said side surface having an engaging portion at the other edge of the cartridge case for engaging the tip end of the film for thereby feeding the film outside the cartridge case by the pivotal movement of the side surface.

According to the present invention, the aforementioned object can be accomplished also by a photographic film cartridge comprising: a cartridge case having a longitudinal axis, opposite end walls, a film outlet for feeding the film out and a shielding material for keeping the interior of the cartridge case shielded from external light; a spool extending substantially coaxially with respect to the cartridge case and carried at the opposite end portions by the opposite end walls of the cartridge case for rotation about the longitudinal axis of the spool, the spool being capable of being rotated from outside of the cartridge case; a film wound into a roll on the spool with an end of the film connected with the spool; a sprocket wheel rotatably provided in the cartridge case for engaging with sprocket holes of the film and capable of being rotated from outside of the cartridge case for feeding the tip end of the film out through the film outlet by rotation of the sprocket wheel.

According to the present invention, the aforementioned object can be accomplished also by a photographic film cartridge comprising: a cartridge case having a longitudinal axis, opposite end walls, a film outlet for feeding the film out and a shielding material for keeping the interior of the cartridge case shielded from external light; a spool extending substantially coaxially with respect to the cartridge case and carried at the opposite end portions by the opposite end walls of the cartridge case for rotation about the longitudinal axis of the spool, the spool being capable of being rotated from outside of the cartridge case; a film wound into a roll on the spool with an end of the film connected with the spool; arc-shaped openings formed about the center of the spool in opposite end walls normal to the longitudinal axis of the cartridge case; a film feeding member having engaging portions engaging to the outermost surface of the roll of the film and projecting portions projecting through the arc-shaped openings to the outside of the cartridge case and slidable along the arc-shaped openings.

In a preferred embodiment of the present invention, the whole roll of the film is stored in the cartridge case.

The above object and advantageous features of the present invention will become apparent from the following description made with reference to the attached drawings.

BRIEF DESCRIPTON OF THE DRAWINGS

FIG. 1b is a cross-sectional view along the line $X_1$—$X_1$ in FIG. 1a.

FIG. 2b is a cross-sectional view along the line $X_2$—$X_2$ in FIG. 2a.

FIG. 11b is a cross-sectional view along the line Y—Y in FIG. 11a.

DESCRIPTION OF THE PREFERRED EMBODIMENTS

Figure 1A:
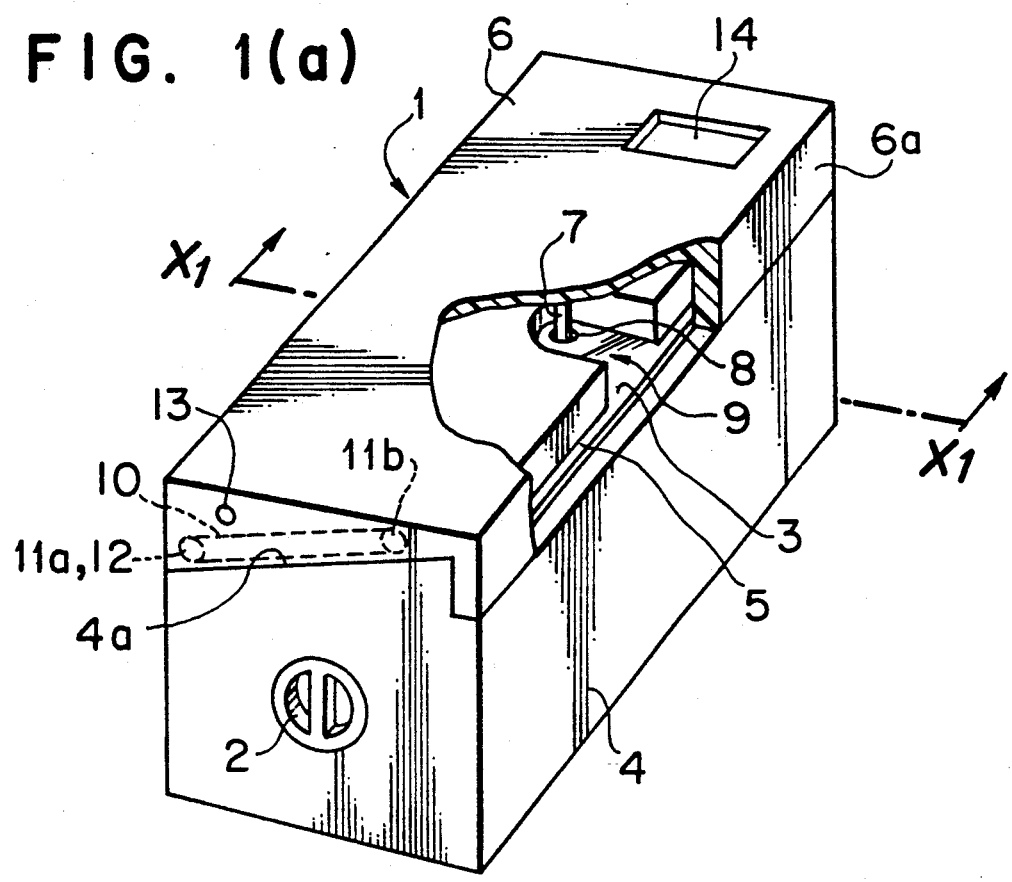
FIG. 1a is a perspective view of a film cartridge in accordance with the present invention with a slidable cover thereof shut.
Figure 1B:
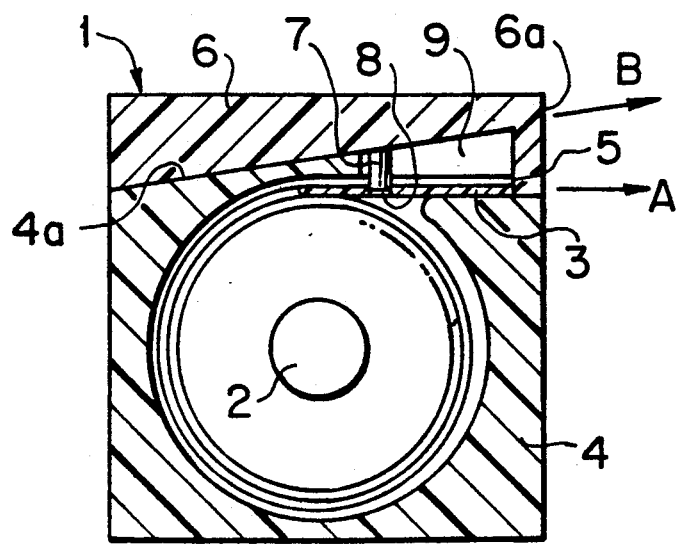

FIGS. 1a and 1b illustrate a photographic film cartridge in accordance with the present invention. The photographic film cartridge 1 comprises a spool 2, a film 3 wound into a roll on the spool 2 with an end connected with the spool and a cartridge case 4. The spool 2 extends substantially coaxially with respect to the cartridge case 4 and is carried at the opposite end portions by the opposite end walls of the cartridge case 4 for rotation about the longitudinal axis of the spool 2. This spool 2 can be rotated from outside of the cartridge case 4. The cartridge case 4 has a longitudinal axis and opposite end walls together with a film outlet 5 for feeding the film 3 out.

A slidable cover 6 is provided on the cartridge case 4. The slidable cover 6 slidably moves along a slanting surface 4a of the cartridge case 4 in a direction, shown by an arrow B in FIG. 1b, which is inclined to the film feeding direction shown by an arrow A in FIG. 1b. The slidable cover 6 has a tip end portion 6a for shutting a film outlet 5. The inner surface of the slidable cover 6 is provided with a pin 7 near the film outlet 5 and a hole 8 is formed at the tip end of the film 3 to engage with the pin 7. The cartridge case 4 is provided with a notch 9 around the pin 7. Prior to feeding the film 3 out, the pin 7 engages with the hole 8 as shown FIG. 1a. The opposite end walls of the cartridge case 4 are provided with grooves 10 with recesses 11a and 11b formed at both ends of the grooves 10. The slidable cover 6 has on its inner surface hemispherical projections 12 for engaging with the grooves 10 so as to move slidably as the hemispherical projections 12 slide along the grooves 10. The slidable cover 6 is kept stationary in the open and closed positions when the hemispherical projections 12 fit into the recesses 11a and 11b, respectively. In addition, the slidable cover 6 has a hole 13 for engaging with a slidable cover sliding mechanism (not shown) and an opening 14 through which a film-feeding roller of the camera (not shown) contacts with the film 3.

The film cartridge 1 having the aforementioned constitution is operated as follows. The film cartridge 1 is loaded into a camera in the condition shown in FIG. 1a. When loaded into a camera, the film outlet 5 is kept shut by the tip end portion 6a of the slidable cover 6 with the hemispherical projections 12 fit in the recesses 11a to keep the slidable cover 6 stationary so that the interior of the cartridge 1 is kept shielded from external light. The whole roll of the film 3 is stored in the cartridge case 4 and no film leader is necessary for pulling the film out of the cartridge by a certain length. Nor is it necessary to engage any such leader with the film-feeding mechanism of the camera. The cartridge 1 need only be loaded into the film compartment of the camera.

As the film cartridge 1 is loaded into the camera, the slidable cover sliding mechanism (not shown) of the camera engages with the hole 13 to pull the slidable cover 6 in the direction shown by the arrow B in FIG. 1b. Thus, the hemispherical projections 12 are released from the recesses 11a to slide along the grooves 10 so that the slidable cover 6 starts to slide in direction of the arrow B.

Figure 2A:
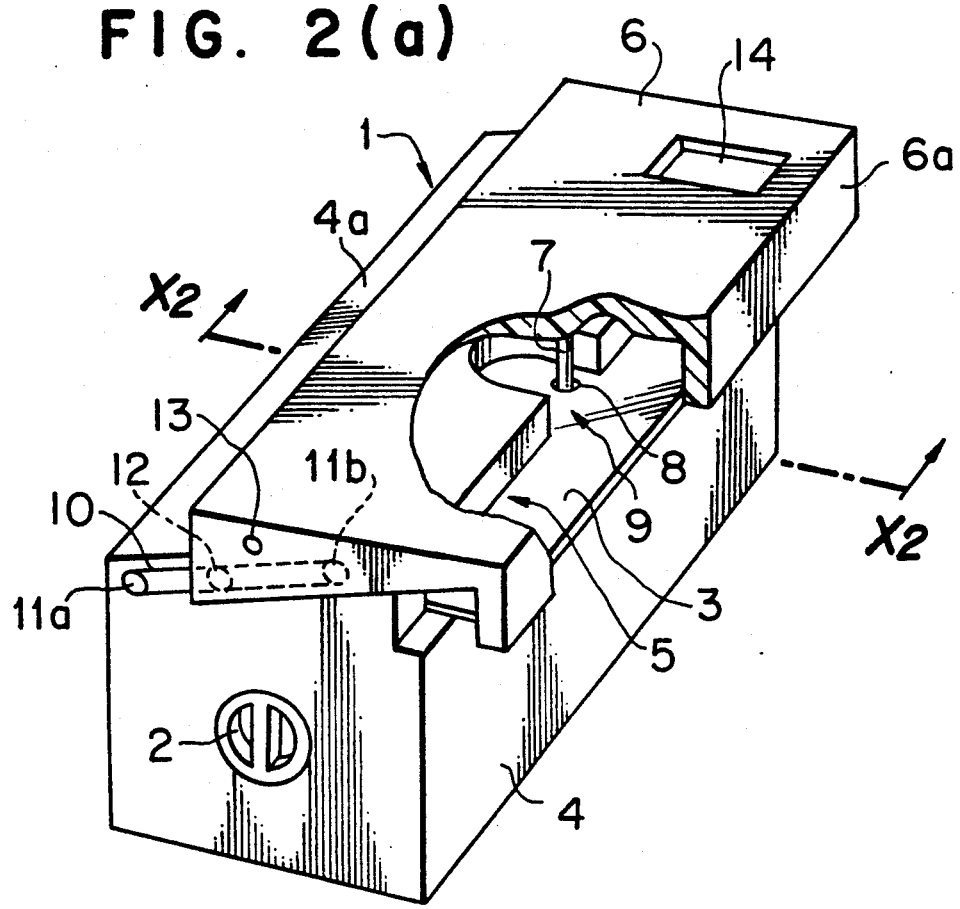
FIG. 2a is a partially cut-away perspective view of a film cartridge in accordance with the present invention with a slidable cover thereof open.
Figure 2B:
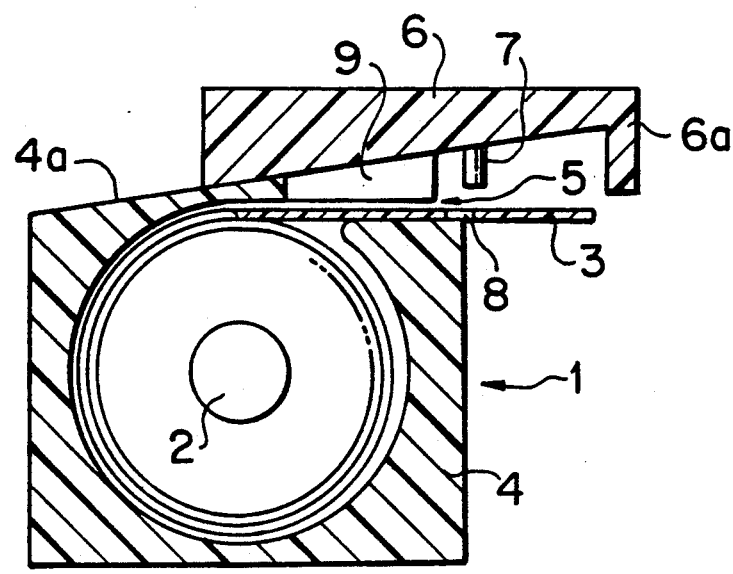

FIGS. 2a and 2b illustrate the slidable cover 6 sliding. As shown in FIG. 2a, the film outlet 5 shut by the tip end portion 6a of the slidable cover 6 gradually opens as the slidable cover 6 slides in the arrow B direction. Since the pin 7 engaged with the hole 8 of the film 3 moves together with the slidable cover 6, the film 3 is fed out through the film outlet 5 which has already been opened. As the slidable cover 6 slides further, it moves obliquely upward, as shown in FIG. 2b, so that the pin 7 moves upwardly and separates from the film 3. Therefore, the pin 7 is released from engagement with the hole 8 at a certain point as shown in FIG. 2b. The film 3 stops moving at that point. The slidable cover 6 continues to slide until the hemispherical projections 12 fit in the recesses 11b. When the hemispherical projections 12 fit in the recesses 11b, the slidable cover 6 is kept stationary in its open position. Thereafter, the film 3 is fed by the film-feeding mechanism (not shown) of the camera to an exposure position in the camera. During feeding of the film, the tip end portion 6a of the slidable cover 6 and the pin 7 are located at a distance from the film 3, so that the film 3 is not prevented from being fed by the film-feeding mechanism of the camera.

When the roll of film has been used up, the slidable cover 6 is slid by the slidable cover sliding mechanism of the camera in the direction opposite to the arrow B until the hemispherical projections 12 fit in the recesses 11a after the film 3 is wound again on the spool 2 by rotating the spool in the direction opposite to the film-winding direction. Thus, the film outlet 5 is shut and the slidable cover 6 is kept stationary by the engagement between the hemisperical projections 12 and the recesses 11a so that the interior of the cartridge case 4 is kept shielded from external light. Then, the film cartridge 1 can be taken out of the camera.

Figure 3:
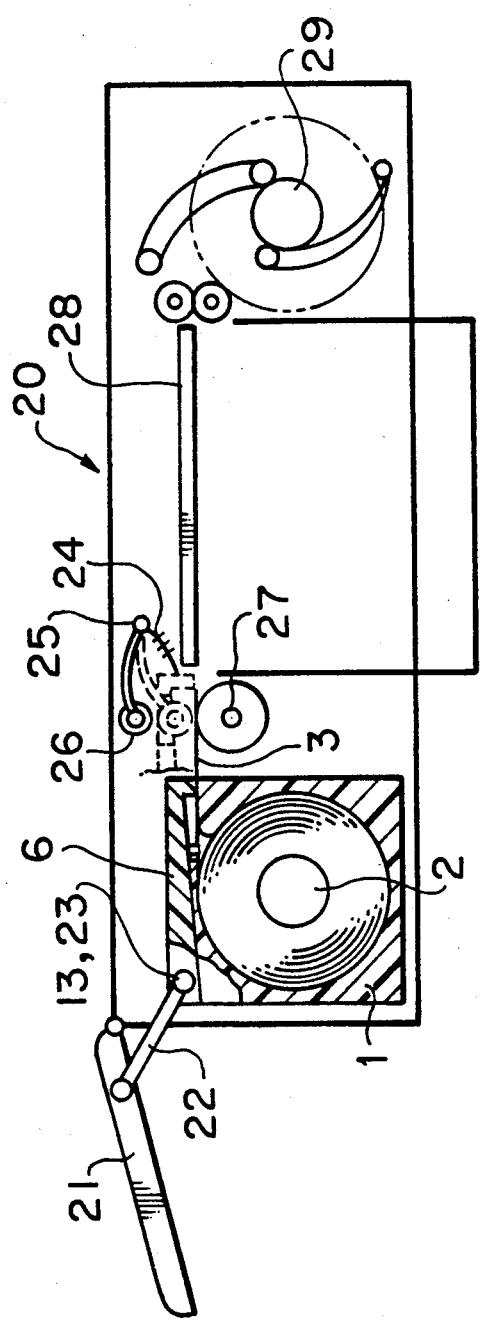
FIG. 3 is a schematic view illustrating a film feeding mechanism of a camera suitable for the photographic film cartridge in accordance with the present invention.

FIG. 3 shows an example of a film-feeding mechanism of a camera suitable for the film cartridge 1. The film cartridge 1 is loaded into a camera 20 after opening a side cover 21. The side cover 21 is provided with a rod 22 for opening and shutting the slidable cover. The rod 22 has a pin 23 at its tip end for engaging with the hole 13 of the slidable cover 6. When the cartridge 1 is loaded into the camera 20, the pin 23 engages with the hole 13 to slide the slidable cover 6 by the movement of the rod 22 as the side cover 21 shuts. Thus, the film outlet 5 is opened and at the same time the pin 7 pulls the film 3 to feed it out through the film outlet 5. When the side cover 21 is fully shut, the hemispherical projections 12 of the slidable cover 6 fit in the recesses 11b and the slidable cover 6 reaches its open position. Then, the tip end portion 6a of the slidable cover 6 comes in contact with and pushes a lever 24 in the camera 20. The lever 24 is connected at a connection point 25 with a nip roller 26 which is pivotable about the connection point 25 so that the nip roller 26 is detachably engaged with a feed roller 27. When the tip end portion 6a of the slidable cover 6 pushes the lever 24, the nip roller 26 makes a pivotal movement about the point 25 in the counterclockwise direction to move from the solid line position to the broken line position in FIG. 3. The nip roller 26 interposes the fed-out film 3 between itself and the feed roller 27 through the opening 14 on the slidable cover 6. Then, the film 3 is fed to an exposure plate 28 by rotating the feed roller 27 in the clockwise direction. The film 3 is fed to a shaft 29 to be wound after exposure. The film 3 is wound back on the spool 2 by rotating the spool 2 in the counterclockwise direction after all the film 3 has been exposed. When the side cover 21 is opened, the hemispherical projections 12 are released from the recesses 11b. As the hemispherical projections 12 slide along the grooves 10, the slidable cover 6 slides till the projections 12 fit in the recesses 11a to keep the slidable cover 6 stationary. Thereafter, the film cartridge 1 can be taken out of the camera 20. The nip roller 26 returns to the initial position shown by the solid line after the tip end portion 6a of the cover 6 moves to the left in FIG. 3 away from the lever 24.

Figure 4B:
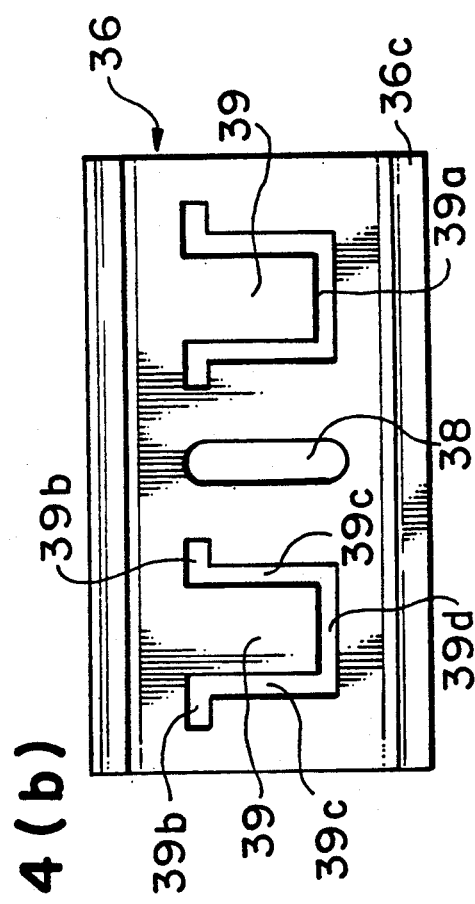
FIG. 4b is a front view of the cartridge case of the embodiment of FIG. 4a viewed from the film feeding direction.
Figure 4A:
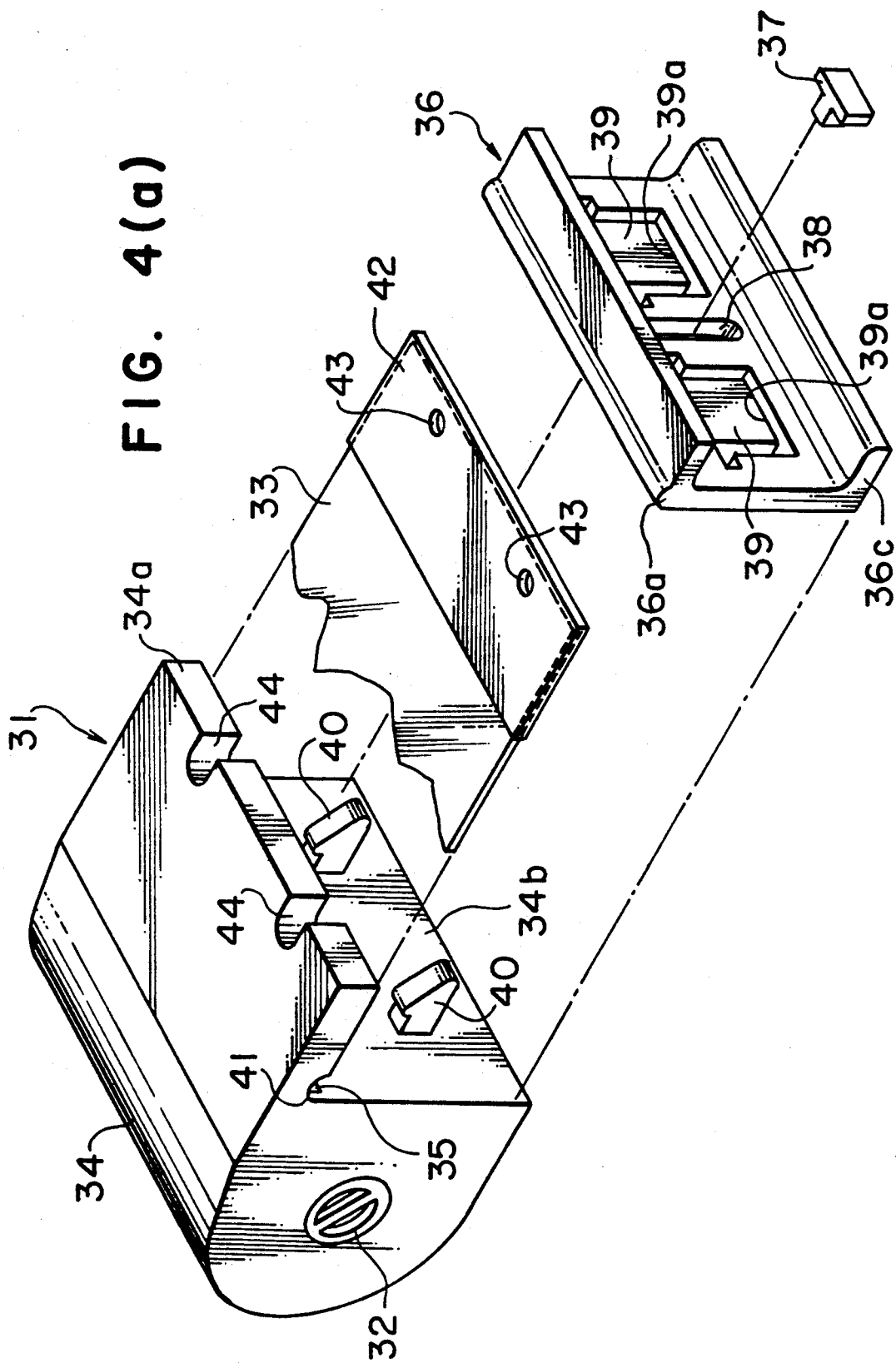
FIG. 4a is a perspective view showing the constitution of the film cartridge of another embodiment.
Figure 5A:
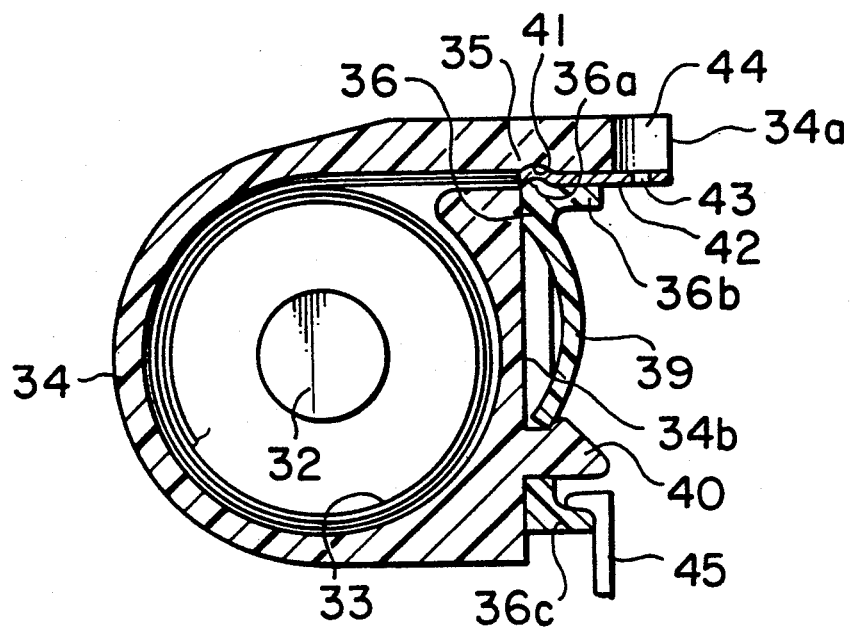
FIG. 5a is a cross-sectional view of the cartridge case at the time when the slidable cover shuts the film outlet.
Figure 5B:
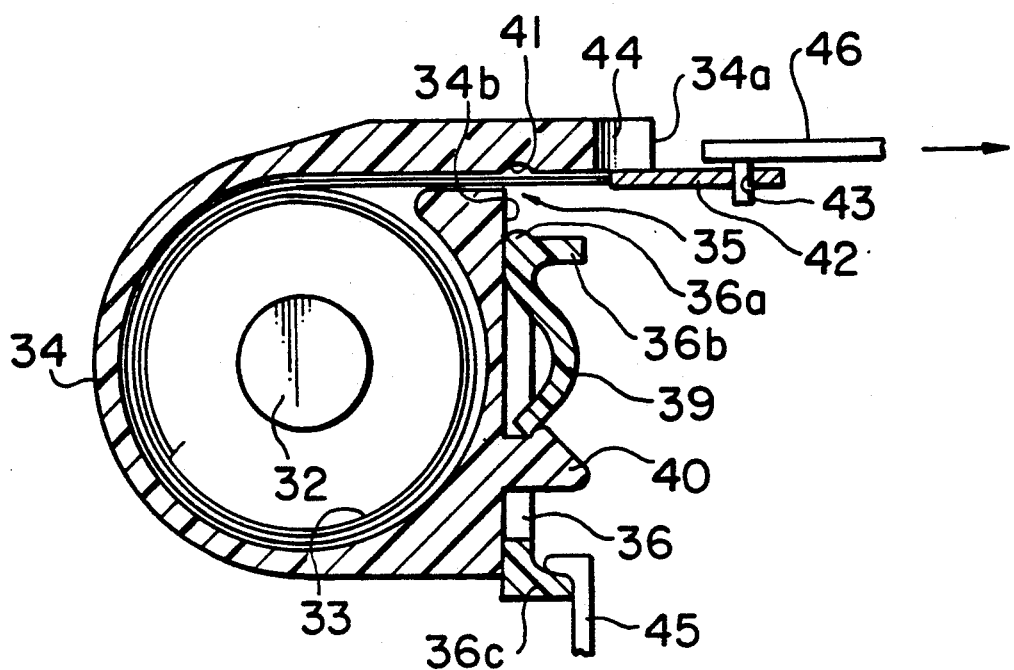
FIG. 5b is a cross-sectional view of the cartridge case at the time when the slidable cover moves to open the film outlet and feeds out the film.

FIGS. 4a and 4b illustrate an another embodiment in accordance with the present invention. A photographic film cartridge 31 comprises a spool 32, a film 33 wound into a roll on the spool 32 with an end connected with the spool and a cartridge case 34. The spool 32 extends substantially coaxially with respect to the cartridge case 34 and is carried at the opposite end portions by the opposite end walls of the cartridge case 34 for rotation about the longitudinal axis of the spool 32. This spool 32 can be rotated from outside of the cartridge case 34. The cartridge case 34 has a longitudinal axis and opposite end walls together with a film outlet 35 for feeding the film 33 out. The cartridge case 34 is formed with a projecting portion 34a projecting from the film outlet 35 in the film-feeding direction and is provided with the slidable cover 36. The slidable cover 36 is formed substantially in the shape of an angular U lying on its side. A guide piece 37 is attached to a surface 34b of the cartridge case 34 through a long hole 38 formed on the slidable cover 36 so that the slidable cover 36 is slidable along the surface 34b in the direction normal to the film-feeding direction. The guide piece 37 also prevents the slidable cover 36 from separating from the cartridge case 34. As shown in FIG. 4b, the slidable cover 36 has two elastic deformation portions 39 formed by slits 39b, 39c, 39d each extending in three directions. The slidable cover 36 is mounted on the surface 34b so that the lower edges 39a of the elastic deformation portions 39 come in contact with hooks 40 formed on the surface 34b, whereby the slidable cover 36 is pressed onto the lower surface of the projecting portion 34a by the elastic deformation portions 39, which are slightly bent as shown in FIG. 5a. The slidable cover 36 is provided with a hemispherically projecting portion 36a on its upper surface and the cartridge case 34 is provided at the lower surface of the projecting portion 34a with a groove 41 for fitting with the hemispherically projecting portion 36a. The portion 36a fits with the groove 41 and the upper surface 36b of the slidable cover 36 presses the film 33 toward the lower surface of the projecting portion 34a so that the film 33 is kept stationary. A shielding paper 42 covers both sides of the tip end of the film 33 so that the tip end of the film 33 is thicker than the vertical width of the film outlet 35. The tip end of the film 33 is arranged in alignment with the tip end of the projecting portion 34a. The film 33 has two holes 43 near its tip end and two notches 44 are formed with the projecting portion 34a in alignment with the holes 43.

The film cartridge 31 is used as follows. As shown in FIG. 5a, the tip end of the film 33 is covered with the shielding paper 42 and the slidable cover 36 closes the film outlet 35 so that the interior of the cartridge 31 is kept shielded from external light. When the film cartridge 31 is loaded into a camera, a lever 45 of the camera for moving the slidable cover 36 engages with the lower edge 36c of the slidable cover 36 to slide the cover 36 downward along the surface 34b. Then, the lever 45 remains stationary to keep the film outlet 35 opened. The lever 45 can be controlled to move interlockingly with a back cover of the camera. As the lower edges 39a of the elastic deformation portions 39 stay in contact with the hooks 40 formed on the surface 34b, downward movement of the slidable cover 36 makes the elastic deformation portions 39 much more bent than previously. The slidable cover 36 stays stationary as urged toward the projecting portion 34a by the elastic deformation portions 39. When the film outlet 35 opens, the film-feeding mechanism 46 engages with the holes 43 formed near the tip end of the film 33 to feed the film 33 out. Thereafter, the film 33 is exposed and is then wound back on the spool 32 by rotating the spool 32 in the counterclockwise direction after the film has been used up.

The tip end of the film 33 is prevented from entering the film outlet 35 by the shielding paper 42 covering the tip end of the film so that not all the film is wound back into the cartridge 31. When the shielding paper 42 hits on the film outlet 35, the lever 45 is released from engagement with the lower edge 36c of the slidable cover 36. Then, the slidable cover 36 returns to the initial position shown in FIG. 5a by means of the elastic force produced by the elastic deformation portions 39 to close the film outlet 35 as the elastic deformation portions 39 bend to urge the slidable cover 36 toward the projecting portion 34a. Thereafter, the cartridge 31 can be taken out of the camera.

In the aforementioned embodiments, though the tip end of the film is fed out by means of the combination of the pin 7 and the hole 8 or the combination of the film-feeding mechanism 46 and the holes 43, means for keeping a film tightly wound on a spool can be adapted instead to obtain the same effect. When a film is tightly wound on a spool, it can be fed out through a film outlet by rotating the spool in the direction opposite to the film-winding direction after the slidable cover has been slid to open the film outlet. The film can, however, be thereafter forwarded by means of the film-feeding mechanism (not shown) in the camera.

Examples of means for keeping a film tightly wound on a spool are thereafter described.

Figure 6:
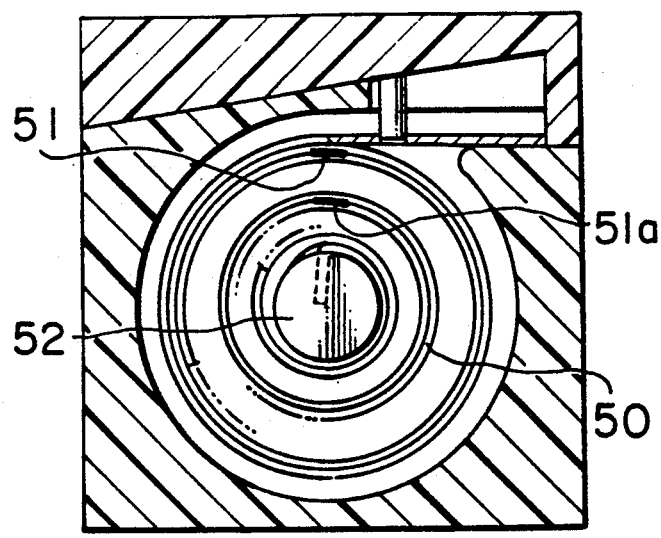
FIG. 6 is a cross-sectional view of a cartridge case including adhesive means.

Adhesive means, as one of means for keeping a film tightly wound on a spool, is shown in FIG. 6. A roll of film 50 has an adhesive means 51 for adhering an inner surface at the end of the first winding, i.e. the outermost winding to the outer surface at the end of the second winding. The adhesive means 51 has adhesive force sufficient to keep the film 50 tightly wound on the spool 52 and capable of being overcome by a slight magnitude of force to release the adhesion between the surfaces of the film. The roll of film 50 may be provided with a plurality of adhesive means. The embodiment shown in FIG. 6, for instance, has two adhesive means, one of which is indicated by the reference number 51 and the other is indicated by the reference number 51a, which adheres an inner surface of the Mth winding of the roll to an outer surface of the (M+1)th winding. A double-coated adhesive tape, heat seal or other adhesive mass may, for instance, be used as the adhesive means 51.

The film 50 can be kept tightly wound on the spool 52 by means of the adhesive means 51 and 51a. As the adhesion caused by the adhesive means between the surfaces of the film can be released by a small force, the film 50 can be fed out by rotating the spool 52 in the direction opposite to the film-winding direction.

Figure 7A:
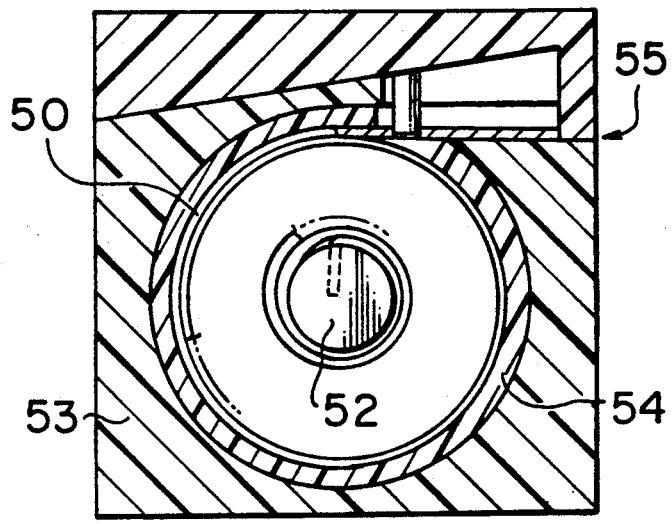
FIG. 7a is a cross-sectional view of a cartridge case including rib means.
Figure 7B:
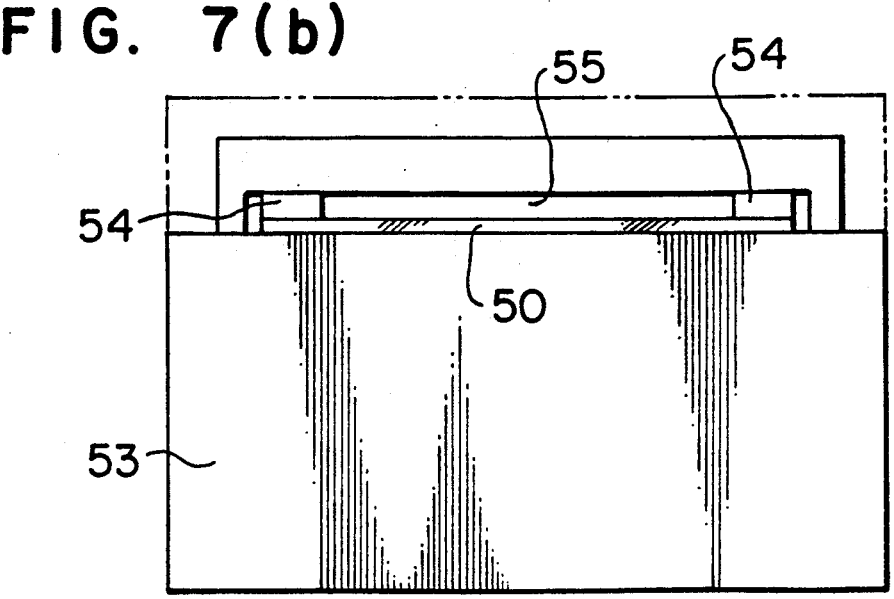
FIG. 7b is a front view of the cartridge case including rib means.

Another example of the adhesive means, the rib means, is shown in FIGS. 7a and 7b. The film cartridge in accordance with this embodiment is provided with two ribs 54 which are circumferentially formed so as to face the opposite edges along the inner surface of the cartridge case 53 and maintain pressing contact with the outer surface of the roll. The ribs 54 are formed with openings opposite the film outlet 55.

The film 50 can be kept tightly wound on the spool 52 by means of the ribs 54. Initially, the film 50 tightly wound on the spool 52 is loaded into the cartridge case 53. The ribs 54 formed along the inner surface of the cartridge case 53 contact with the outermost winding of the roll to prevent the film 50 from loosening, so that the film 50 can be kept tightly wound on the spool 52. Therefore, the film 50 can be fed out by rotating the spool 52 in the direction opposite to the film-winding direction.

The ribs 54 need not necessarily be formed circumferentially over the entire inner surface of the cartridge case 53, but may be formed only over a part of the circumference. In addition, the ribs 54 may be formed over the entire film width. The thickness of the ribs 54 is determined in such a way that the ribs 54 come in contact with the outermost winding lap of the roll of film 50 when the film 50 tightly wound on the spool 52 is loaded into the cartridge case 53. The material of the ribs is selected so as not to scratch the film. Plastic is preferable.

Figure 8A:
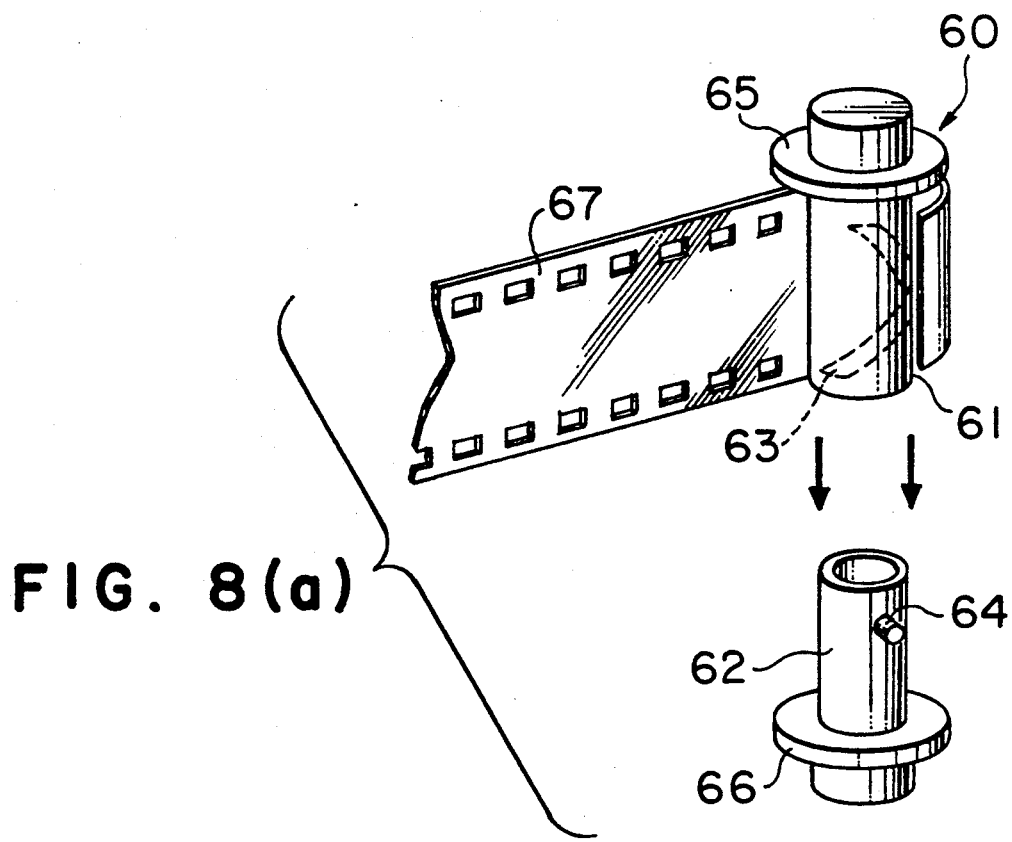
FIGS. 8a and 8b are perspective views illustrating expandable spool means.
Figure 8B:
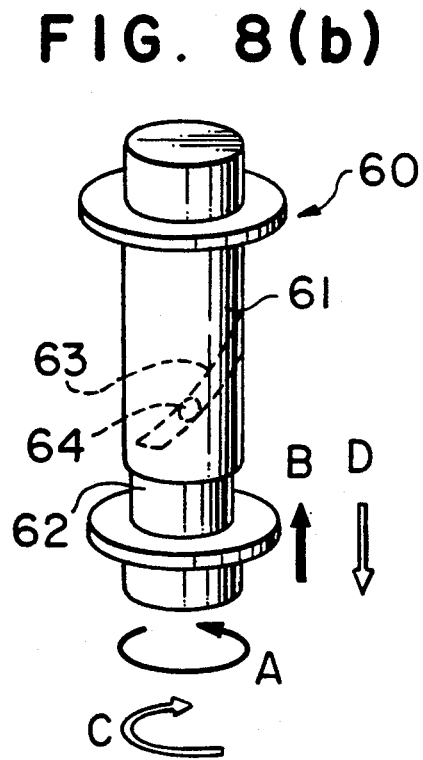

The expandable spool means shown in FIGS. 8a and 8b may be adapted in addition to said rib means. As shown in FIG. 8a, the expandable spool means includes a spool 60 having a first spool portion 61 and a second spool portion 62 which fits into an inner hole of the first spool portion 61. The first spool portion 61 has a groove 63 spirally formed on the inner surface thereof. The second spool portion 62 has a hemispherical projection 64 on the outer surface thereof, which engages with the groove 63 when the second spool portion 62 is fit into the first spool portion 61. Therefore, as shown in FIG. 8b, the hemispherical projection 64 moves along the groove 63 with the result that the second spool portion 62 advances in the direction shown by the arrow B in the case that the second spool portion 62 is rotated in the arrow A direction. On the other hand the second spool portion 62 advances in the arrow D direction in the case that the second spool direction 62 is rotated in the arrow C direction. Thus, the interval between flanges 65 and 66 which are provided on the first and second spool portions respectively can be adjusted. The flanges 65 and 66 have slightly convex inner surfaces for clamping the outermost winding of the roll of the film therebetween. The inner surfaces of the flanges 65 and 66 preferably have a high coefficient of friction. The roll of the film 67 is arranged to be smaller in diameter by means of said rib means than the diameter of the flanges 65 and 66.

Prior to using the cartridge, said rib means keep the outermost surface of the roll of the film 67 located within the circumference of the flanges 65 and 66. The interval between the flanges 65 and 66 is maintained to be longer than the width of the film 67 so that the flanges 65 and 66 do not clamp the roll of the film 67 therebetween. When the spool 60 is made to rotate in the direction opposite to the film-winding direction, which is shown by an arrow A, the second spool portion moves in the direction shown by an arrow B to make the interval between the flanges 65 and 66 narrower so that the flanges 65 and 66 clamp therebetween the opposite ends of the outermost surface of the roll of the film 67. As a result, when the spool 60 is made to rotate in the film-feeding direction indicated by the arrow A, the flanges 65 and 66 are also made to rotate together with the spool 60 so that the film 67 clamped by the flanges 65 and 66 is fed out through the film outlet.

Figure 9A:
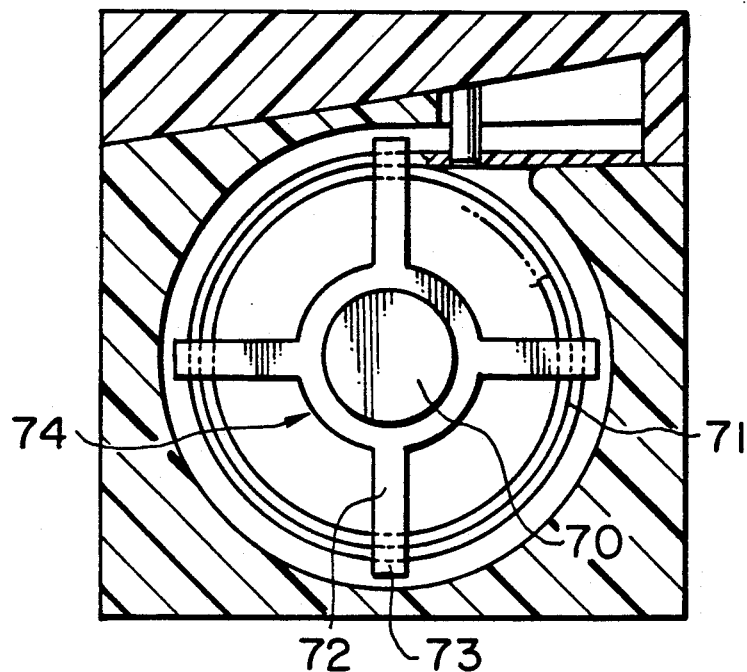
FIGS. 9a and 9b are cross-sectional views of a cartridge case including flange means.
Figure 9B:
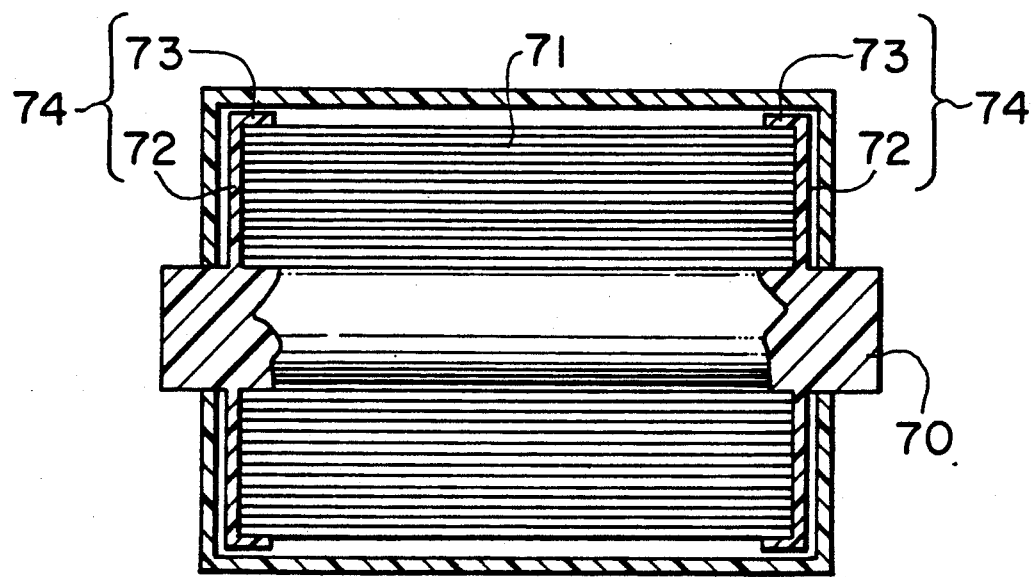

The flange means, as one of means for keeping a film tightly wound on a spool, is shown in FIGS. 9a and 9b.

A spool 70 in the film cartridge shown in FIGS. 9a and 9b is provided with flanges 74 having opposite walls 72 maintained in contact with the opposite edges of a roll of film 71 tightly wound on a spool 70 and tip end portions 73 engaging with the outermost winding of the roll of film 71. The flanges 74 can be formed in any form. They may be of cross-type as shown in FIG. 9a, or alternatively may be circular, linear shape or the like and is sufficient for them to have at least one tip end portion for engaging with the outermost winding of the roll of film 71. Alternatively, at least one of the flanges 74 may be arranged to be detachable from the spool 70.

The film 71 can be kept tightly wound on the spool 70 by means of the pair of flanges 74. After the film 71 is tightly wound on the spool 70, one of the flanges 74, which is detachably formed, is fitted on the spool 70 to bring the tip end portions 73 in contact with the outermost winding of the roll of film 70. Thus, the film 71 is prevented from loosening and is kept tightly wound on the spool 71. Therefore, the film 71 can be fed outside of the cartridge by rotating the spool 70 in the direction opposite to the film-winding direction.

Figure 10A:
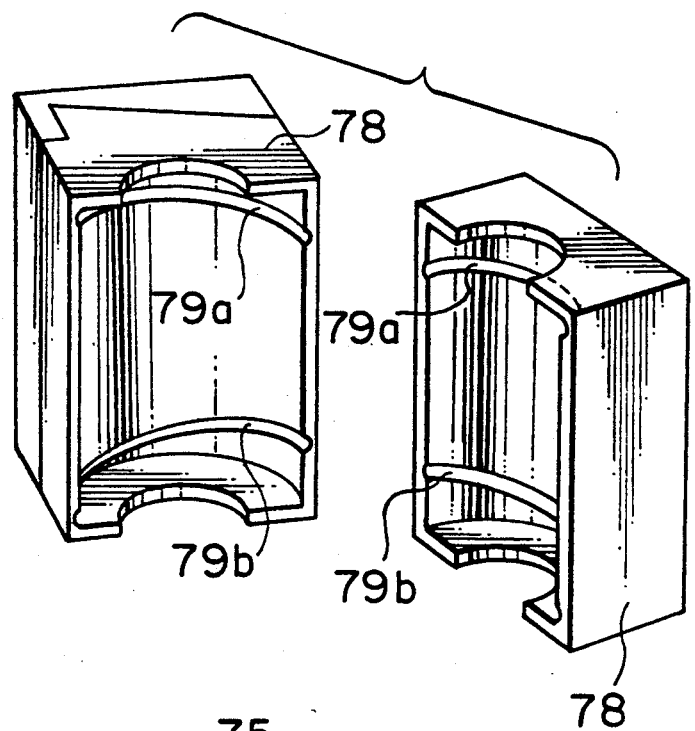
FIG. 10a is a perspective view of a cartridge case suitable for ring means.
Figure 10B:
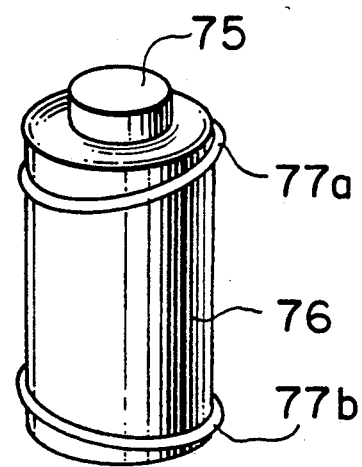
FIG. 10b is a perspective view of ring means.
Figure 10C:
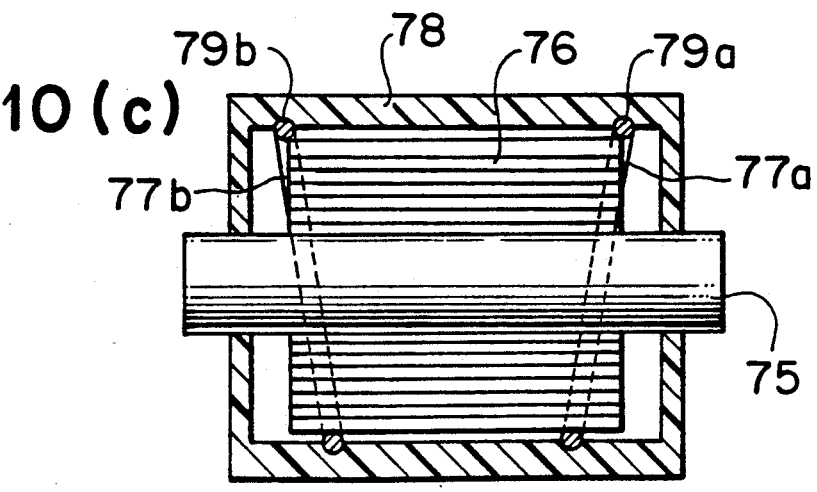

The ring means, as another means for keeping a film tightly wound on a spool, is shown in FIGS. 10b, 10b and 10c. As shown in FIG. 10a, a film 76 tightly wound on a spool 75 is kept tightly wound by means of a pair of rings 77a and 77b provided at both edges of the film 76. The cartridge case 78 is provided on the inner surface thereof with circular grooves 79a and 79b to be fit over the rings 77a and 77b in such a way that the center axes of the circular grooves 79a and 79b incline relative to the longitudinal axis of the cartridge case 78. Therefore, as shown in FIGS. 10b and 10c, in the cartridge case 78 the rings 77a and 77b get in contact with the most outer lap of the roll of the film 76 at a certain angle to the longitudinal axis of the spool 75 to prevent the roll of the film 76 from loosening. The rings 77a and 77b can slide along the circular grooves 79a and 79b to rotate about the spool 75.

The film 76 can be fed out through a film outlet (not shown) by rotating the spool 75 in the direction opposite to the film-winding direction as the film 76 is kept tightly wound on the spool 75 by means of the rings 77a and 77b.

Figure 11A:
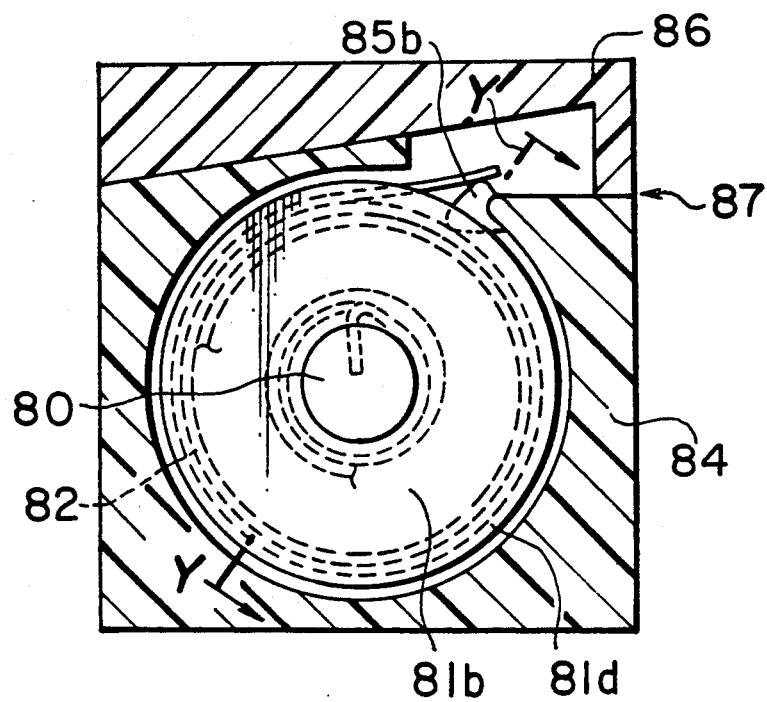
FIG. 11a is a cross-sectional view of a cartridge case including flexible flange means.
Figure 11B:
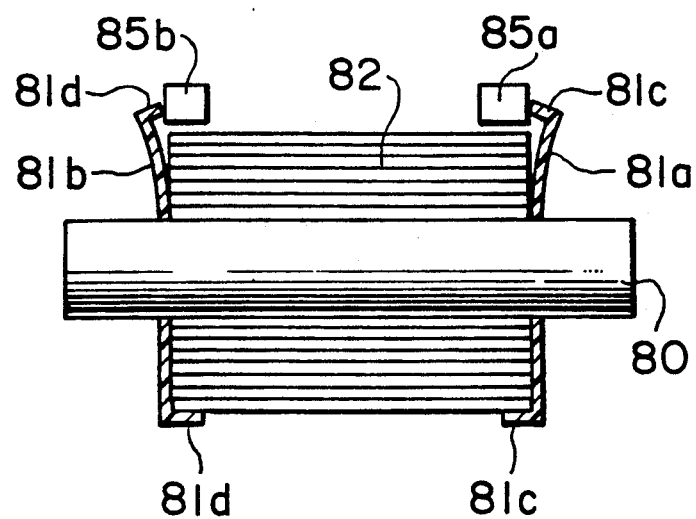

A flexible flange means, as still another means for keeping a film tightly wound on a spool, is shown in FIGS. 11a and 11b. The spool 80 is provided at its opposite ends with a pair of circular flexible flanges 81a and 81b which are rotatable relative to the spool 80. As shown in FIG. 11b, the flanges 81a and 81b have ribs 81c and 81d extending substantially normally and inwardly from the circumference of the flanges 81a and 81b. The ribs 81c and 81d press the outermost surface of the roll of film 82 so that the film 82 is kept tightly wound on the spool 80. A pair of projections 85a and 85b are formed at an opening portion leading to the film outlet 87 on an inner wall forming a cylindrical space in which the roll of the film 82 is housed. As shown in FIG. 11b, the pair of projections 85a and 85b are spaced apart from each other in the direction of the longitudinal axis of the cartridge case 84 in such a way that they keep in contact with the ribs 81c and 81d but do not keep in contact with the outermost surface of the roll of film 82. The flanges 81a and 81b are made to outwardly bend by keeping in contact with the ribs 81c and 81d. The film 82 is kept tightly wound on the spool 80 by the portion of the ribs 81c and 81d located symmetrically with the projections 85a and 85b.

When the spool 80 is made to rotate in the direction opposite to the film-winding direction, the roll of film 82 held tightly wound on the spool 80 by means of the ribs 81c and 81d rotates in the same direction. Since the flanges 81a and 81b are rotatable with respect to the spool 80, the torque for rotating the spool 80 can be decreased. As shown in FIG. 11b, since the flexible flanges 81a and 81b are made to outwardly bend by the projections 85a and 85b in the vicinity of the film outlet 87, the outermost surface of the roll of film 82 is released from the pressure of the ribs 81c and 81d in the vicinity of the projections 85a and 85b. Therefore, when the spool 80 is made to rotate, the film 82 can be fed out through the film outlet 87 which has been opened by the movement of the slidable cover 86. In addition, the projections 85a and 85b can guide the tip end of the film 82 toward the film outlet 87.

Figure 12:
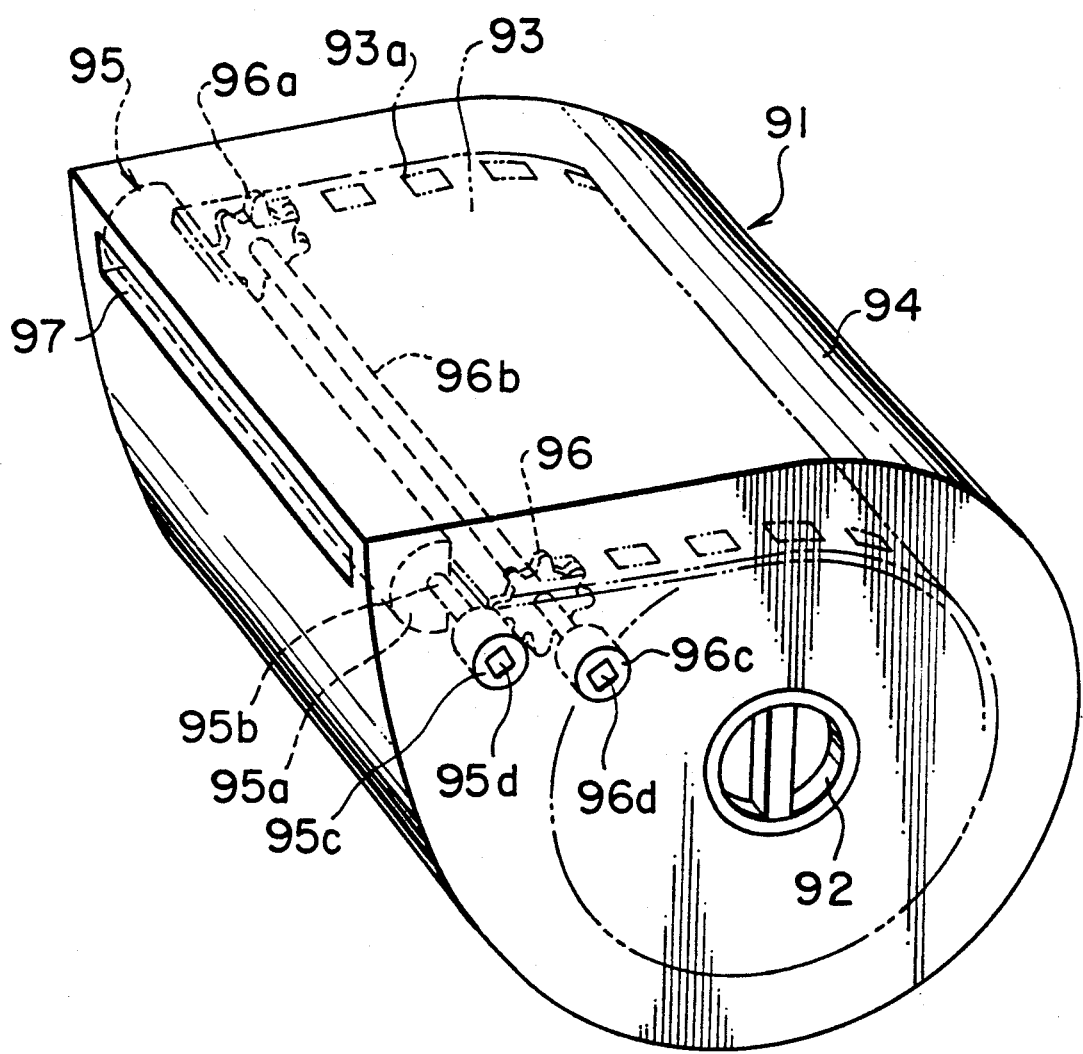
FIG. 12 is a perspective view illustrating an another embodiment of the present invention.
Figure 13:
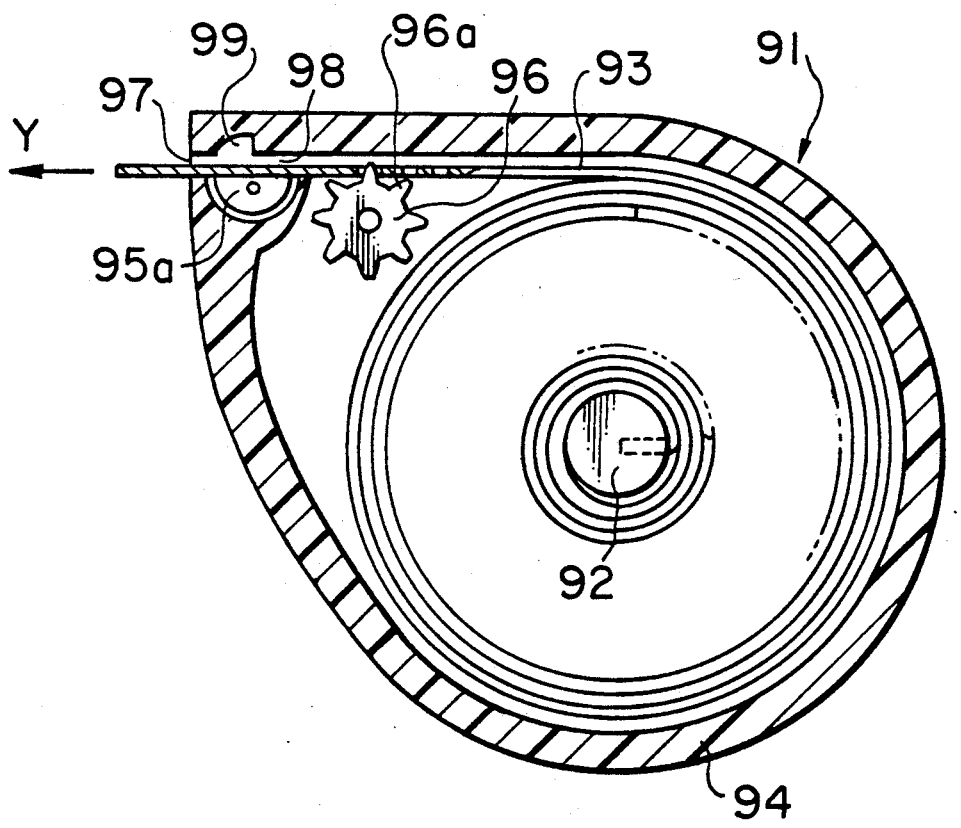
FIG. 13 is a cross-sectional view of the embodiment shown in FIG. 12.

FIGS. 12 and 13 illustrate another photographic film cartridge in accordance with the present invention. The photographic film cartridge 91 comprises a spool 92, a film 93 wound into a roll on the spool 92 with an end connected with the spool 92 and a cartridge case 94. The spool 92 extends substantially coaxially with respect to the cartridge case 94 and is carried at the opposite end portions by the opposite end walls of the cartridge case 94 for rotation about the longitudinal axis of the spool 92. The cartridge case 94 is provided with a film outlet 97 through which the film 93 is fed out, a shielding means 95 for keeping the interior of the cartridge case 94 shielded from external light, and a pair of sprocket wheels 96.

The shielding means 95 includes a bar 95a having a semicircle cross-section. The bar 95a is supported on a shaft 95b which extends beyond the opposite ends of the bar 95a. The shaft 95b has enlarged diameter end portions 95c which are pivotably supported by the end walls of the cartridge case 94. The enlarged diameter portions 95c have square recesses 95d on their outer surfaces, coaxially with the axis of the shaft 95b. The cartridge case 94 is provided with a space 99 having the cross-sectional shape of a circle with one quadrant cut away and the bar 95a is accommodated in this space. The space 99 extends parallel with the axis of the shaft 95b and its center lies slightly below a film-feeding path 98 leading to a film outlet 97. The semicircular bar 95a can thus make pivotal movement between a first position shown in FIG. 12 wherein the flat surface of the semicircular bar 95a is normal to the film-feeding path 98 and a second position shown in FIG. 13 wherein the flat surface of the semicircular column 95a is parallel to the film-feeding path 98.

Each of the pair of sprocket wheels 96 has teeth 96a having the same pitch as the longitudinal interval between sprocket holes 93a which are provided at both edges of the film 93 and is located near the shielding means 95 in such a way that the teeth 96a engage with the sprocket holes 93a from the under-surface of the film 93. The pair of sprocket wheels 96 are integrally connected through a shaft 96b which has enlarged diameter tip portions 96c extending outwardly beyond the sprocket wheels 96. The enlarged diameter portions 96c have square recesses 96d on the end surfaces, coaxially to the axis of the shaft 96b, and are pivotably supported by the opposite end walls of the cartridge case 94. The tip end of the film 93 is located inside the cartridge case 94.

The film cartridge case 91 having the aforementioned constitution is used as follows. Before being loaded into a camera, the film cartridge 91 is in the state shown in FIG. 12. The semicircular bar 95a of the shielding means 95 is located in the first position normal to the film-feeding path 98 so that external light is prevented from entering into the interior of the cartridge case 94 through the film outlet 97. Thus, the interior of the cartridge case 94 is kept shielded from external light. The sprocket holes 93a of the film 93 are in engagement with the teeth 96a of the sprocket wheels 96 and the tip end of the film 93 is located immediately behind the semicircular bar 95a.

When the film cartridge 91 is loaded into a camera, there must be four square cross-sectional engaging members (not shown) of the camera to engage with the square recesses 95d and 96d of the enlarged diameter portions 95c and 96c respectively. The engaging member engaging with the square recesses 95d rotate the semicircular column bar 95a by an angle of 90 degrees in the counterclockwise direction in FIG. 12 via the enlarged diameter portion 95c and the shaft 95b. Thus, the semicircular bar 95a moves from the first position to the second position, so that the film-feeding path 98 which has up to now been closed by the semicircular bar 95a is communicated with the film outlet 97. Next, the engaging member of the camera engaging the square recesses 96d rotates the pair of sprocket wheels 96 in the counterclockwise direction in FIG. 12 via the enlarged diameter portion 96c and the shaft 96b. As the teeth 96a of the sprocket wheels 96 are engaged with the sprocket holes 93a, the film 93 is fed outside the cartridge 91 through the film outlet 97 by rotating the sprocket wheels 96 in the counterclockwise direction as shown by an arrow Y in FIG. 13. Thereafter, a film-feeding mechanism (not shown) in the camera engages the film 93 to lead it to an exposure area. When the entire film has been exposed, the film 93 can be wound back on the spool 92 by rotating the sprocket wheels 96 in the clockwise direction.

Two sprocket wheels 96 are not absolutely necessary and, alternatively, a single sprocket wheel may be provided to engage one of row of sprocket holes 93a. The pair of sprocket wheels 96 need not necessarily be connected via the shaft 96b, but may be arranged so that they independently make a pivotal movement. In this case the shaft 96b need not be provided. Furthermore, the sprocket wheels 96 may be arranged to engage with the front surface of the film 93. The means for driving the sprocket wheels 96 can be replaced with other driving means, including a conventional one. The semicircular bar 95a of the shielding means 95 can be replaced with other shielding means. For instance, the currently used felt shielding means can be used. Alternatively a wall of the film cartridge may be formed in such a way that it can move to open and close the film outlet 97.

Figure 14A:
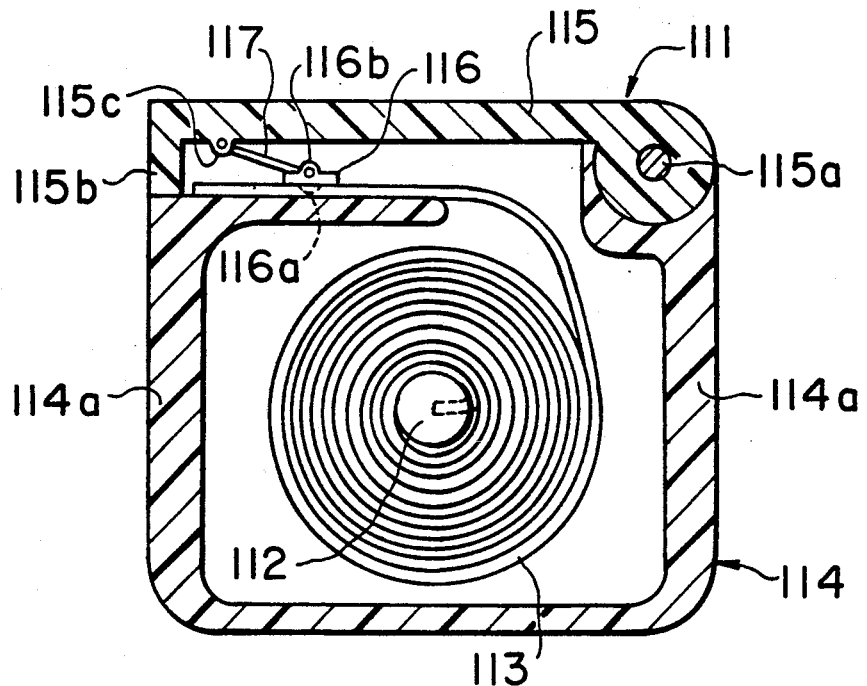
FIGS. 14a and 14b are cross-sectional views of another embodiment of the present invention.
Figure 14B:
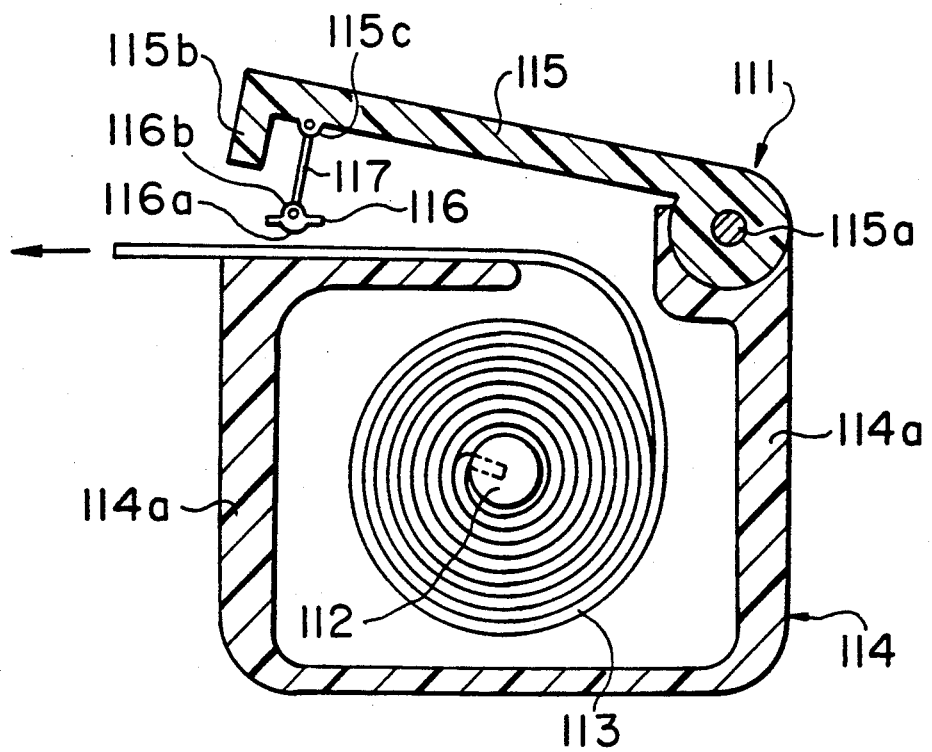

FIGS. 14a and 14b show another embodiment of the present invention. A photographic film cartridge 111 comprises a spool 112, a film 113 wound into a roll on the spool 112 with an end connected with the spool 112 and a cartridge case 114. The spool 112 extends substantially coaxially with respect to the cartridge case 114 and is carried at the opposite end portions by the opposite end walls of the cartridge case 114 for rotation about the longitudinal axis of the spool 112. The cartridge case 114 has a longitudinal axis and opposite end walls.

The cartridge case 114 is provided with a cover 115 pivotably carried at one of edge thereof by means of a shaft 115a at an end back wall 114a of the cartridge case 114 so that the cover 115 can make pivotal movement about the shaft 115a. The cover 115 has at its tip end an end portion 115b extending normally therefrom for shielding the interior of the cartridge case 114 from external light when the end portion 115b is in contact with a front side wall 114a of the cartridge case 114.

The tip end of the film 113 is located immediately behind the end portion 115b. A pair of engaging members 116 engage sprocket holes (not shown) in the vicinity of the end portion 115b which are formed at opposite edges of the film 113 in the width direction. The engaging members 116 are provided with hemispheres 116a on the reverse surface thereof for engaging the sprocket holes (not shown) on the film 113. The engaging members 116 have a pivotal joint 116b on the upper surface thereof which pivotably connects with a rod 117 the other end of which is pivotably connected with the reverse surface of the cover 115 via a joint 115c formed in the vicinity of the end portion 115b. The cover 115 is provided at the end portion 115b with a pair of projections (not shown) outwardly extending in the direction of the axis of the spool 112.

The film cartridge 111 works as follows. The film cartridge 111 is loaded into a camera with the cover 115 closed as shown in FIG. 14a. A engaging mechanism provided in the camera engages with the projections (not shown) provided at the end portion 115b to pivotally rotate the cover 115 about the shaft 115a in the clockwise direction. As the cover 115 makes pivotal movement, a film outlet through which the film is fed out is opened between the lower surface of the end portion 115b and the side wall 114a of the cartridge case 114. As the cover 115 moves further, the engaging member 116 is moved to the left in FIG. 14b by the rod 117. As the hemispheres 116a constituting a part of the engaging members 116 are engaged with the film 113, the hemispheres 116a feed the film 113 to the left in FIG. 14a. The film 113 is fed outside the cartridge case 114 through the film outlet which has already been formed. As the cover 115 makes further pivotal movement, the film 113 is released from engagement with the hemispheres 116a of the engaging member 116. Then, the film 113 stops moving at the lease point. Thereafter, the film-feeding mechanism of the camera engages the film 113 to feed the film 113 to the exposure area.

After all the film has been used up, the film 113 can be wound back on the spool 112 by rotating the spool 112 in the direction opposite to the film-winding direction. When all the film 113 is wound on the spool 112, the engaging mechanism (not shown) of the camera which has engaged with the projections (not shown) formed at the opposite ends of the end portion 115b pivotally rotates the cover 115 about the shaft 115a in the counterclockwise direction to close the film outlet. Thus, the interior of the cartridge case 111 is again shielded from external light. Then, the film cartridge 111 can be taken out of the camera.

In this embodiment, instead of the hemispheres 116a to be engaged with the film 113, an adhesive means such as a adhesive tape having weak adhesive force or means exerting frictional force on the film 113 can be adapted to feed the film 113 as the cover 115 makes a pivotal movement.

A hole to be engaged by the hemisphere 116a of the engaging member 116 may be provided with the film 113 instead of the sprocket holes.

Figure 15:
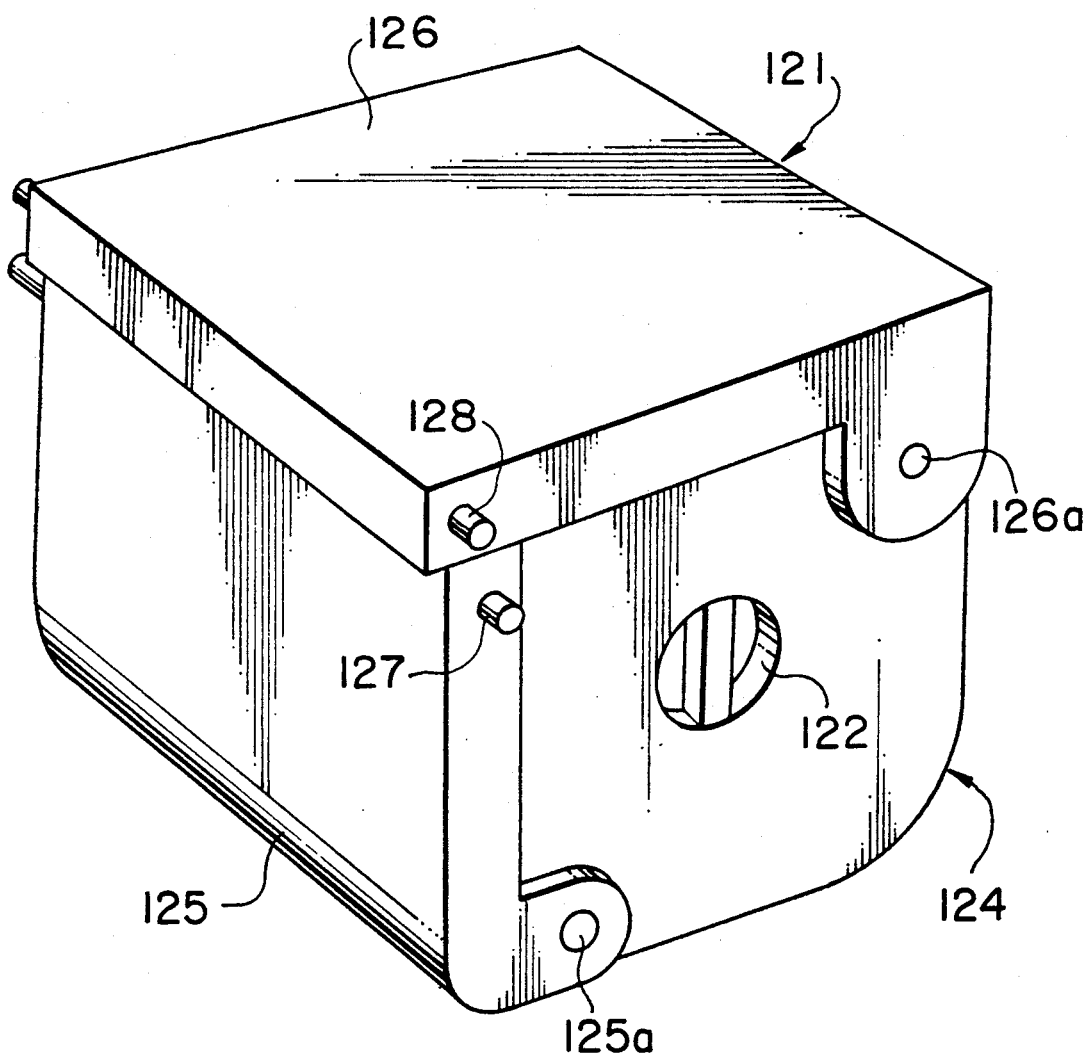
FIG. 15 is a perspective view of an another embodiment of the present invention.
Figure 16A:
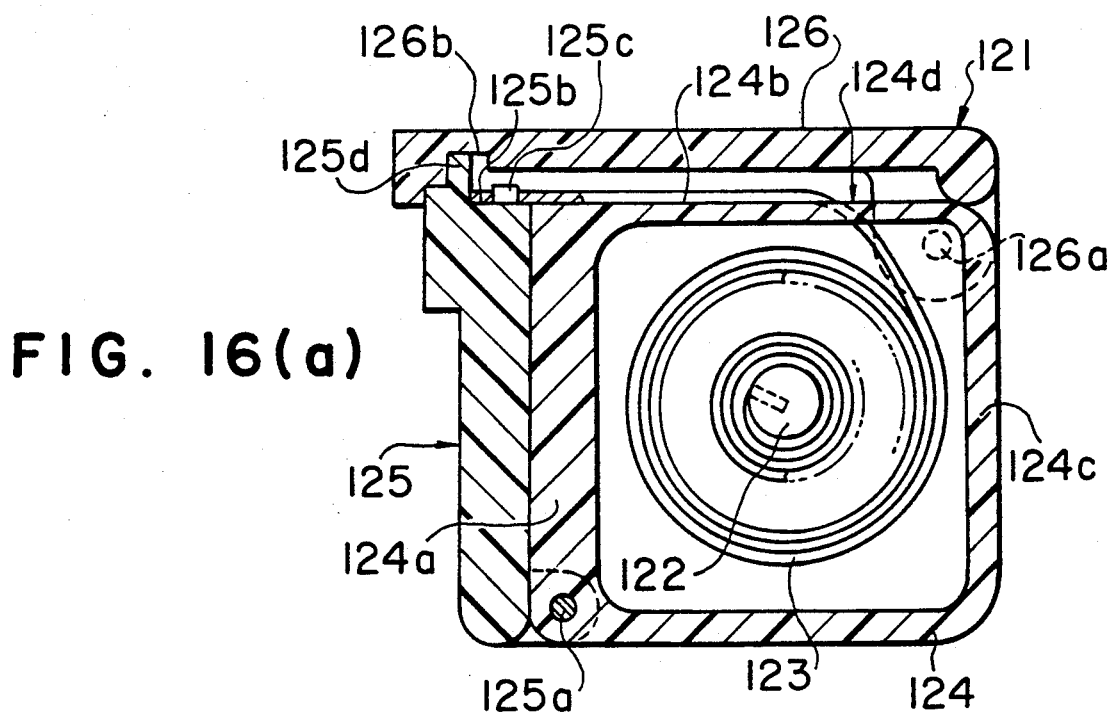
FIGS. 16a and 16b are cross-sectional views of the embodiment shown in FIG. 15.
Figure 16B:
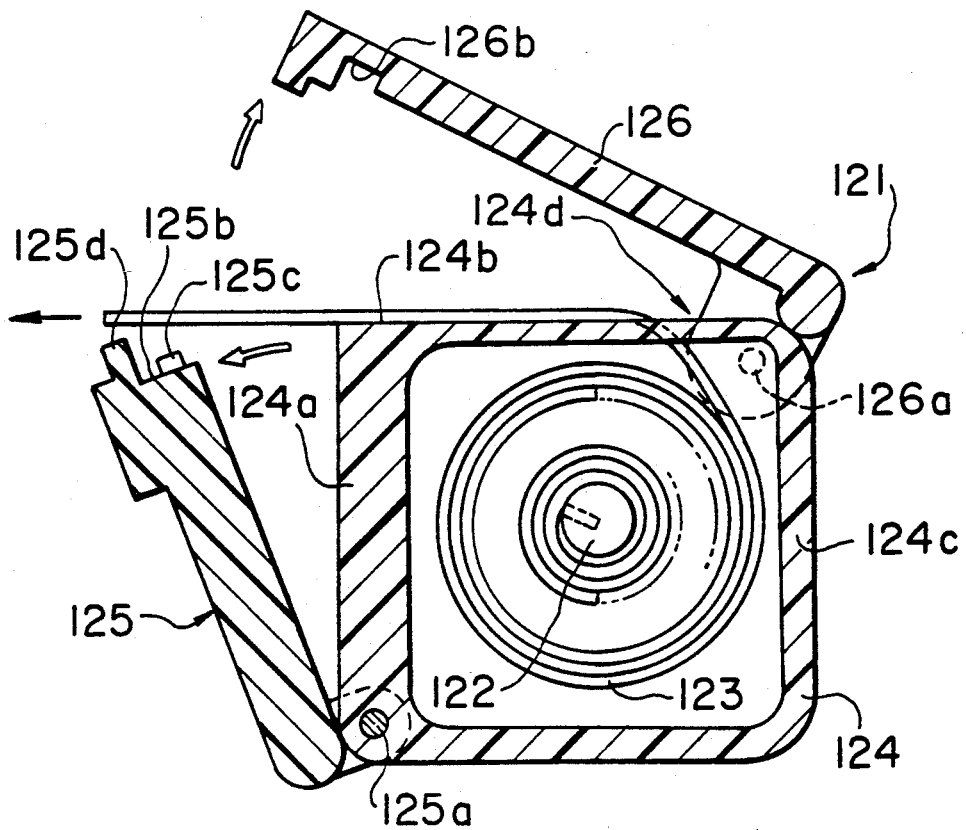

FIGS. 15, 16a and 16b illustrate another embodiment. A photographic film cartridge 121 comprises a cartridge case 124 having a longitudinal axis and opposite end walls; a spool 122 extending substantially coaxially with respect to the cartridge case 124 and carried at the opposite end portions by said opposite end walls of the cartridge case 124 for rotation about the longitudinal axis of the spool 122; a film 123 wound into a roll on the spool 122 with an end of the film 123 connected with the spool 122. The spool 122 can be rotated from outside of the cartridge case 124. The cartridge case 124 has an opening 124d for drawing the film 123 out.

The cartridge case 124 includes a cover 125 which is pivotably carried on a shaft 125a at a side wall 124a of the cartridge case 124 so that the cover 125 can make pivotal rotation about the shaft 125a. The cover 125 makes pivotal movement between a first position wherein the cover 125 maintains contact with the side wall 124a of the cartridge case 124 as shown in FIG. 16a and a second position wherein the cover 125 is apart from the side wall 124a of the cartridge case 124 as shown in FIG. 16b. The cover 125 has an upper surface 125b which in the first position is flush with a film-feeding surface 124b of the cartridge case 124. The upper surface 125b is provided thereon with projections 125c to engage with sprocket holes (not shown) formed at opposite edges of the film 123. In addition, the cover 125 is provided on the upper surface 125b with a square projection 125d extending in the direction of the longitudinal axis of the cartridge case 124. The film 123 is housed in the cartridge case 124 with the sprocket holes engaged with the projections 125c. The tip end of the film 123 is located in contact with the square projection 125d.

The cartridge case 124 is provided with a cover 126 carried at the side walls 124c of the cartridge case 124 so that the cover 126 can pivotally rotate about the shaft 126a. The cover 126 can make pivotal movement between a first position shown in FIG. 16a and a second position shown in FIG. 16b. The cover 126 is provided with a recess portion 126b on the reverse surface thereof. In the first position, the recess portion 126b engages with the square projection 125d to keep the interior of the cartridge case 124 shielded from external lights.

The cover 125 is provided at opposite side walls with a pair of projections 127 and the cover 126 is provided at opposite end walls with a pair of projections 128 in the vicinity of the recess portion 126b.

The film cartridge 121 is used as follows. The film cartridge 121 is loaded into a camera with the cover 126 closed as shown in FIGS. 15 and 16a. After the cartridge 121 is loaded into the camera, a first engaging mechanism (not shown) in the camera engages the projections 128 on the end walls of the cover 126 to pivotally rotate the cover 126 about the shaft 126a in the clockwise direction from the first position shown in FIG. 16a to the second position shown in FIG. 16b. The first engaging mechanism of the camera keeps the cover 126 in the second position. Next, a second engaging mechanism (not shown) in the camera engages the projections 127 to pivotally rotate the cover 125 about the shaft 125a in the counterclockwise direction so that the cover 125 moves from its first position shown in FIG. 16a to its second position shown in FIG. 16b.

As the sprocket holes (not shown) are engaged with the projections 125c formed on the upper surface 125b, the film 123 is pulled to the left in FIG. 16b and fed to the outside of the cartridge case 124 when the cover 125 moves pivotal to the second position.

After the film 123 has been fed by a certain length, the projections 125c are released from engagement with the sprocket holes of the film 123 before the cover 125 reaches the second position. Thereafter, a film-feeding mechanism (not shown) provided in the camera engages the tip end of the film 123 which has already been fed out and feeds the film 123 to an exposure area in the camera. After all the film 123 has been exposed, the spool 122 is made to rotate in the clockwise direction by a drive-mechanism of the camera to wind the film 123 on the spool 122. When all the film 123 has been wound back on the spool 122, the second engaging mechanism of the camera cause the cover to pivotally rotate in the clockwise direction to return the cover 125 to the first position and then the first engaging mechanism of the camera causes the cover 126 to pivotally rotate in the counterclockwise direction to return the cover 126 to the first position. Thus, the film cartridge 121 returns to the state before being loaded into the camera as shown in FIG. 16a so that the cartridge 121 can be taken out of the camera.

In this embodiment, though the cover 126 is arranged to be able to pivotally rotate about the shaft 126a, some other arrangement may be adapted. For instance, the cover 126 can be fixed to the shaft 126a. In this case, the first engaging mechanism of the camera engages to the projections 128 and lifts up the cover 126, thereby bending the cover 126 into the second position.

Figure 17:
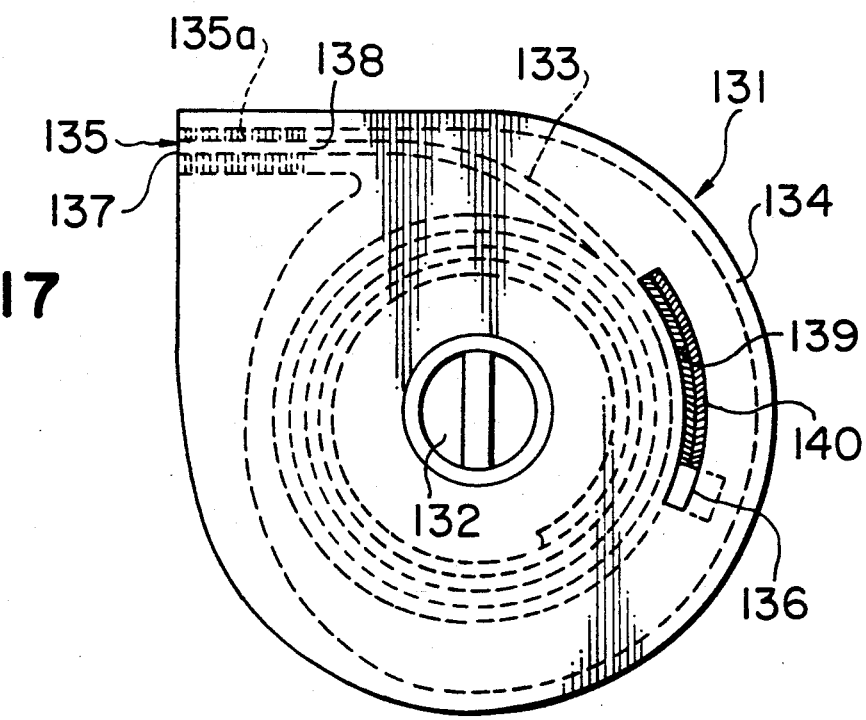
FIG. 17 is a side view of an another embodiment of the present invention.
Figure 18:
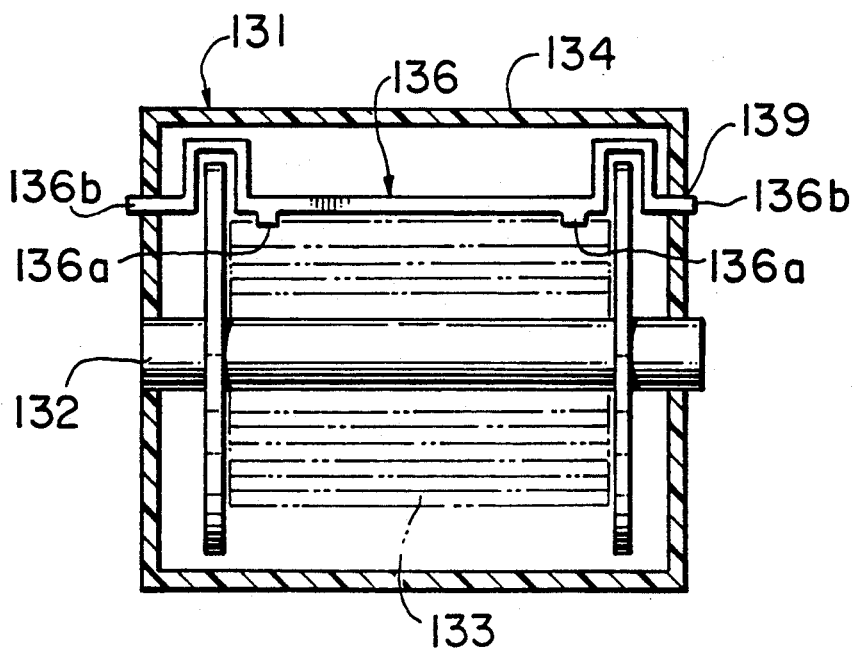
FIG. 18 is a cross-sectional view of the embodiment shown in FIG. 17.

FIGS. 17 and 18 illustrate another embodiment of the present invention. A photographic film cartridge 131 comprises a cartridge case 134 having a longitudinal axis, opposite end walls, a film outlet 137 through which the film 133 is fed out and a shielding material 135 for keeping the interior of the cartridge case 134 shielded from external light; a spool 132 extending substantially coaxially with respect to the cartridge case 134 and carried at the opposite end portions by said opposite end walls of the cartridge case 134 for rotation about the longitudinal axis of the spool 132; a film 133 wound into a roll on the spool 132 with an end of the film 133 connected with the spool 132; and a film-feeding member 136. The spool can be rotated from outside of the cartridge case 134. The shielding material 135 comprises a pair of felt members 135a provided on the upper and lower surfaces of a film-feeding path 138 and extending from a film outlet 137 toward the interior of the cartridge case 134 by a prescribed length. The whole roll of the film 133 is housed in the cartridge case 134 with the tip end thereof located in alignment with the film outlet 137.

As shown in FIG. 17, opposite end walls of the cartridge case 134, which are normal to the longitudinal axis of the spool 132, are provided with arcuate openings 139. The arcuate openings 139 are formed concentric with the center of the spool 132 and in alignment with the outermost winding of the roll of film 133 wound on the spool 132. The length of the arcuate openings 139 is determined in accordance with the length of the film 133 to be initially fed outside the cartridge case 134 through the film outlet 137. The arcuate openings 139 are covered with shielding curtains 140 to prevent external light from entering the cartridge case 134.

The film-feeding member 136 has engaging portions 136a engaged with the sprocket holes of the outermost winding of the roll of the film 133 wound on the spool 132 and projecting portions 136b projecting through the arcuate openings 139 to the outside of the cartridge case 134 and arranged to slidably move along the arc-form openings 139. The shielding curtains 140 do not prevent the projecting portions 136b of the film-feeding member 136 from sliding along the arc-form openings 139.

The film cartridge 131 is used as follows. The film cartridge 131 is loaded into a camera in the state as shown in FIG. 17. As shown in FIG. 17, the projecting portions 136b of the film-feeding member 136 are initially located at the lowermost position of the arcuate openings 139. When the film cartridge 131 is loaded into the camera, an engaging mechanism (not shown) of the camera engages the projecting portions 136b of the film-feeding member 136. Then the engaging mechanism of the camera slides the projecting portions 136b along the arcuate openings 139 in the counterclockwise direction in FIG. 17 to the uppermost position of the arcurate openings 139. Since the film 133 is engaged with the film-feeding member 136 through the projecting portions 136b, the film 133 is fed together with the film-feeding member 136 as the film-feeding member 136 slides. Thus, the tip end of the film 133 is fed out through the film outlet 137 by the same length as the distance by which the film-feeding member 136 slides. The film 133 parts from the roll and advances to the film outlet 137 in the vicinity of the uppermost position of the arcuate openings 139, so that the sprocket holes of the film 133 are released from engagement with the projecting portions 136b when the projecting portions 136b slide to the uppermost position of the arcuate openings 139 and stop there.

Thereafter a film-feeding mechanism (not shown) engages the tip end of the film 133 and feeds the film 133 to an exposure area in a camera. After the film has been used up, the spool 132 is rotated by the drive-mechanism (not shown) of the camera in such a direction that the film 133 is wound on the spool 132.

In this embodiment, though the engaging portions 136a engage to sprocket holes of the film 133 so as to feed the film 133, the adhesive means or the frictional member mentioned in the previous embodiments may be used instead of the engaging portions 136a. Alternatively, the film 133 can be provided with one or more holes other than the sprocket holes for engagement with the engaging portions 136a.

An urging means for urging the film-feeding member 136 to the lowermost position in the arcuate opening 139 may be provided on the cartridge 131. In this case, the film 133 is fed outside the cartridge 131 when a driving-mechanism of the camera releases the urging force on the film-feeding member 136.

Other shielding means for shielding the interior of the cartridge 131 from the external light may be used instead of the felt 135a in this embodiment.

The arcuate opening 139 need not necessarily be formed in alignment with the most outer surface of the roll of the film 133. It may be formed at any place on the opposite end walls of the cartridge case 134 under the condition that the projecting portions 136b are engaged with the arcuate openings.

As aforementioned with respect to the preferred embodiments, according to the present invention, a photographic film cartridge can be obtained which is capable of feeding the film from the inside to the outside of the cartridge. As a result, the film cartridge can be loaded in a camera more easily without risk of misloading, and exposure of the film caused by pulling the leader out more than needed can be prevented.

The present invention has been shown and described with reference to specific embodiments. However, it should be noted that the present invention is in no way limited to the details of the described arrangements but all alternatives, modifications, and equivalents may be included within the spirit and scope of the invention as defined in the attached claims.

We claim:

1. A photographic film cartridge comprising:
   a cartridge case having a longitudinal axis, opposite end walls and a film outlet for feeding film out;
   a spool extending substantially coaxially with respect to said cartridge case and carried at opposite end portions by said opposite end walls of said cartridge case for rotation about the longitudinal axis of the spool, said spool being capable of being rotated from outside of the cartridge case;
   a film wound into a roll on said spool with an end of the film connected with the spool;
   a slidable cover provided on said cartridge case for slidably moving along a surface of the cartridge case in a direction inclined to the film feeding direction to open and shut said film outlet.

2. A photographic film cartridge in accordance with claim 1, wherein an inner surface of the slidable cover is provided with at least one projection and the tip end of the film is provided with holes in the same number as the number of said projections for engaging with said projections and feeding the film out through said film outlet as said slidable cover slides.

3. A photographic film cartridge in accordance with claim 1, further including means located within said film cartridge for keeping the film tightly wound into a roll on the spool, thereby enabling at least an initial portion of the film, including the tip end of the film, to be fed out through the film outlet by rotating the spool in the direction opposite to the film-winding direction.

* * * * *